(12) United States Patent
Leavitt et al.

(10) Patent No.: US 12,395,549 B2
(45) Date of Patent: Aug. 19, 2025

(54) APPARATUS AND METHOD FOR DATA CONVEYANCE

(71) Applicant: RAPIDSOS, INC., New York, NY (US)

(72) Inventors: Lucas Richard Eager Leavitt, Forest Hills, NY (US); David Paul Sehnert, Lafayette, CO (US); Jordi Cabanas, Brooklyn, NY (US); Benjamin Taylor Harvill, Flushing, NY (US); Lauren Javaly, New York, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 18/215,758

(22) Filed: Jun. 28, 2023

(65) Prior Publication Data
US 2023/0421630 A1    Dec. 28, 2023

Related U.S. Application Data

(60) Provisional application No. 63/356,437, filed on Jun. 28, 2022.

(51) Int. Cl.
*H04L 67/10* (2022.01)
*G06F 9/54* (2006.01)
*G06Q 50/26* (2024.01)

(52) U.S. Cl.
CPC .............. *H04L 67/10* (2013.01); *G06F 9/547* (2013.01); *G06Q 50/265* (2013.01)

(58) Field of Classification Search
None
See application file for complete search history.

(56) References Cited

U.S. PATENT DOCUMENTS

| | | | | |
|---|---|---|---|---|
| 2005/0078635 | A1* | 4/2005 | Choi | H04W 36/08 370/428 |
| 2007/0027801 | A1* | 2/2007 | Botzer | G06Q 40/04 705/39 |
| 2012/0271926 | A1* | 10/2012 | Shakirzyanov | G06F 9/5072 709/220 |
| 2013/0007233 | A1* | 1/2013 | Lv | H04L 61/5038 709/222 |
| 2016/0117121 | A1* | 4/2016 | Bohn | G06F 3/064 711/114 |

(Continued)

OTHER PUBLICATIONS

NENA Standard for Emergency Incident Data Object (EIDO), NENA-STA-021.1-2021, (National Emergency Number Association (NENA) 2021).

(Continued)

*Primary Examiner* — Atta Khan
(74) *Attorney, Agent, or Firm* — Cygan Law Offices PC; Joseph T. Cygan

(57) ABSTRACT

A disclosed data exchange cloud computer system includes a plurality of cloud servers. Each cloud server of the plurality of cloud-servers is operative to: provide an application programming interface operative to establish a plurality of links to a plurality of agency computer systems, where the links enable data exchange between the plurality of agency computer systems; and provide configurable state machines, operative to facilitate data exchange between the plurality of agency computer systems.

14 Claims, 16 Drawing Sheets

(56) References Cited

U.S. PATENT DOCUMENTS

2023/0049959 A1* 2/2023 Schroeder ............ G06F 3/04817
2023/0412732 A1* 12/2023 Chalton ............... H04M 3/5116

OTHER PUBLICATIONS

NENA i3 Standard for Next Generation 9-1-1, NENA-STA-010.3b-2021, (National Emergency Number Association (NENA) 2021).
NENA Standard for the Conveyance of Emergency Incident Data Objects (EIDOs) between Next Generation (NG9-1-1) Systems and Applications, NENA-STA-024.1a-2023, (National Emergency Number Association (NENA) 2023).

* cited by examiner

FIG. 8 -Prior Art-

```
{
  "subcriber":{
  "requestId":"xxx-yyy-zzz",
  "requestType": "EIDO",
  "requestSubType": "new"
}

{
  "unsubcriber":{
  "requestId":"xxx-yyy-zzz",
  "subscriptionId": "sub1234"
}
```

```
{
  "subcriber":{
  "requestId":"xxx-yyy-zzz",
  "requestType": "EIDO",
  "requestSubType": "single",
  "incidentId": <EIDO.$id>
}

{
  "event":{
  "subscriptionId": "sub1234",
  "transactionId": "xxx-yyy-zzz",
  "notification": [
  <EIDO>
  ]}
```

```
{
  "terminate":{
  "requestId": "xxx-yyy-zzz",
  "subscriptionId": "sub1234"
}
```

FIG. 10 though an EIDO describing an incident is not replicated, but rather shared, amongst users — the EIDO Conveyance specification defines how to convey both notifications that an EIDO is available, as well as how to obtain the EIDO itself."

APPARATUS AND METHOD FOR DATA CONVEYANCE

CROSS-REFERENCE TO RELATED APPLICATIONS

The present application claims priority to U.S. Provisional Patent Application No. 63/356,437, filed Jun. 28, 2022, entitled "Apparatus and Method For Emergency Data Conveyance" which is hereby incorporated by reference herein in its entirety, and which is assigned to the same assignee as the present application.

FIELD OF THE DISCLOSURE

The present disclosure relates generally to emergency networks and more particularly to methods and apparatuses for data management and exchange between various emergency networks and external data service providers.

BACKGROUND

Emergency networks for emergency calls such as 9-1-1 calls are continuing to evolve toward Internet based architectures that accommodate voice-over-IP (VoIP) and other IP related services. Legacy emergency networks were unable to accommodate IP related services and were unable to benefit from features and capabilities provided by these more modern implementations. Currently, emergency networks nationwide are working toward compliance with standards set forth by the National Emergency Number Association, Inc. (NENA) as well as compliance with other standards that are useful in evolving toward IP centric functionality. New standards and revisions to existing standards are in development.

The NENA i3 Standard for Next Generation 9-1-1, NENA-STA-010.3b-2021, Oct. 7, 2021, according to its Abstract, "provides the detailed functional and interface specifications for a post-transition IP (Internet Protocol)-based multimedia telecommunications system, including the Core Services and legacy gateways necessary to support delivery of emergency calls via an IP-based Emergency Services IP network." In order to achieve the goals of these systems, data communications must allow for interoperability. For example, NENA states that, "Where are many sources available to communication center personnel for obtaining new Incident information during call handling, Incident creation, dispatch, Incident monitoring, and post Incident analysis processes." Therefore, NENA has defined an Emergency Incident Data Object (EIDO) to facilitate access to these sources. The NENA Standard for Emergency Incident Data Object (EIDO), NENA-STA-021.1a-2022 (Oct. 19, 2021), states in its abstract, "As agencies and regions move forward with implementing NG9-1-1 and IP based emergency communications systems, it is critical that they adhere to a standardized, industry neutral format for exchanging emergency Incident information between disparate manufacturer's systems located within one or more public safety agencies, and with other Incident stakeholders." The NENA website, nena.org, states that, "The Emergency Incident Data Object (EIDO) Standard provides a standardized Javascript Object Notation (JSON) format to convey this information, including from call handling to Computer-Aided-Dispatch (CAD), from CAD to CAD, to field responders, and to other entities." The NENA i3 standard defines an EIDO as "A JSON-based object that is used to share emergency incident information between and among authorized entities and systems." The ECMA website, https://www.ecma-international.org, describes JSON as "a lightweight, text-based, language-independent syntax for defining data interchange formats" that "was derived from the ECMAScript programming language, but is programming language independent." ECMA states that "JSON defines a small set of structuring rules for the portable representation of structured data."

The NENA i3 Standard for Next Generation 9-1-1 specifies handling of authorization and data rights management (DRM) in NG9-1-1 and these processes are based on XACML which is governed by OASIS (Organization for the Advancement of Structured Information Standards). The most current Oasis Standard, eXtensible Access Control Markup Language (XACML) Version 3.0 (Jan. 22, 2013) is available at https://www.oasis-open.org/standards/, however the XACML Version 2.0 (Feb. 1, 2005) is specified in the Oct. 7, 2021 version of the NENA i3 Standard. NENA defines XACML as "a general-purpose access control policy language" which means that "it provides a syntax (defined in XML) for managing access to resources." "XML" refers to "extensible markup language" which NENA defines as "an internet specification for web documents that enables tags to be used that provide functionality beyond that in Hyper Text Markup Language (HTML)" and further states that "in contrast to HTML, XML has the ability to allow information of indeterminate length to be transmitted to a PSAP call taker or dispatcher versus the current restriction that requires information to fit the parameters of pre-defined fields."

In i3 compliant emergency networks, additional data via an additional data repository (ADR) may be sent from, and received by, various entities and agencies (such as Public Safety Answering Points, i.e. PSAPs), etc. and more than one ADR may be utilized. DRM for ADR data and other data generated or accessed by interoperable software systems at each PSAP (contained in EIDOs) may be managed using processes established via XACML Version 2.0. PSAP call handling under i3 involves handling EIDOs and i3 requires that EIDOs be handled according to EIDO Conveyance mechanisms defined in the NENA Standard for the Conveyance of Emergency Incident Data Objects (EIDOs) between Next Generation (NG9-1-1) Systems and Applications, NENA-STA-024.1a-2023.

An Incident Data Exchange (IDX) is defined in i3 as a "Functional Element that facilitates the exchange of Emergency Incident Data Objects (EIDOs) among other Functional Elements both within and external to an agency" (such as a PSAP). DRM based on XACML provides for definition of policies and mechanisms for describing what each policy applies to in terms of user attributes, roles, operations, dates, etc. Rules are definable to permit or deny access under these polices where access is defined as being able to read (retrieve a data object), update (modify an existing data object), create (create a new data object), delete (remove an existing data object) and execute (execute one or more function from a service). Policy rules may thus "permit" or "deny" access to EIDOs and the information contained therein according to i3 requirements. There policies are stored in a "Policy Store."

BRIEF DESCRIPTION OF THE DRAWINGS

FIG. 10 are example syntaxes used in the EIDO conveyance architecture interface/API in accordance with various embodiments.

DETAILED DESCRIPTION

Figure 1:
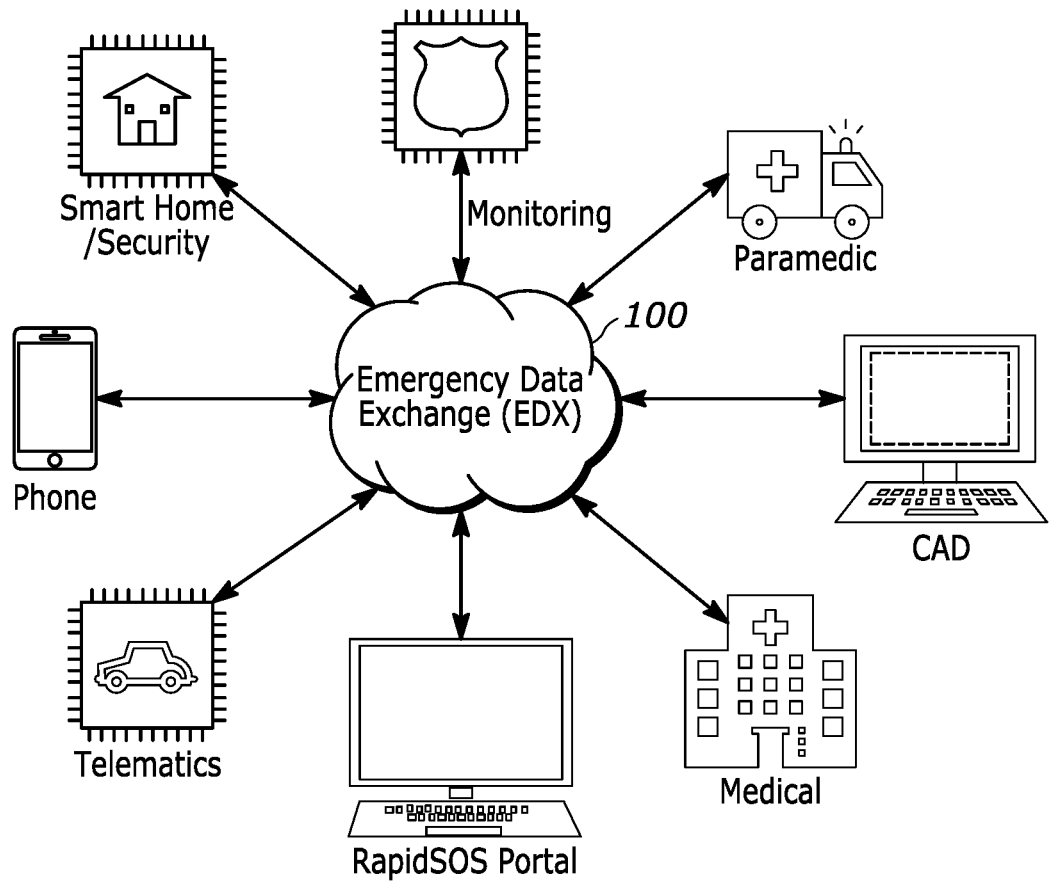
FIG. 1 is a block diagram of an emergency data exchange (EDX) in accordance with various embodiments.

The present disclosure provides, in one aspect an Emergency Data Exchange (EDX) as a cloud-based solution built on a cloud platform, such as AWS GovCloud, that enables interoperability between disparate public safety software systems using the National Emergency Number Association (NENA) Emergency Incident Data Object (EIDO) standard interface. The disclosed EDX enables public safety software vendors to exchange critical incident data with 3rd party products used by any EDX enabled agency or entity involved in an emergency response.

A disclosed data exchange cloud computer system includes a plurality of cloud servers. Each cloud server of the plurality of cloud-servers is operative to: provide an application programming interface operative to establish a plurality of links to a plurality of agency computer systems, where the links enable data exchange between the plurality of agency computer systems; and provide configurable state machines, operative to facilitate data exchange between the plurality of agency computer systems.

In some embodiments, the data exchange cloud computer system may include a multi-tenant cloud-based application environment operative to provide multiple application instances to a plurality of agency computer systems. In some embodiments, the data exchange cloud computer system includes a single-tenant cloud-based application environment operative to provide multiple application instances to a single agency computer system.

The configurable state machines may include an accepted state, and acknowledged state, a canceled state, a timeout state, and a declined state. In some embodiments, each configurable state machine, when configured, may include an accepted state.

The accepted state is an indication that a data object from a sending agency has been accepted by a receiving agency. The acknowledged state is an indication that a data object has been acknowledged to a sending agency by a receiving agency. The declined state is an indication that a data object from a sending agency has been declined by a receiving agency. The canceled state is an indication that an data object has been canceled by a sending agency.

In some embodiments, a data object state is changed to an acknowledged state via a graphical user interface entry received at the receiving agency. In some embodiments, a data object state is changed to an accepted state via a graphical user interface entry received at the receiving agency.

The data exchange cloud computer system may further include executable instructions stored in non-volatile, non-transitory memory, that when executed provide the application programming interface. The data exchange cloud computer system may further include executable instructions stored in non-volatile, non-transitory memory, that when executed provide the configurable state machines.

A disclose method of operating a data exchange cloud computer system that has a plurality of cloud servers includes: providing an application programming interface operative to establish a plurality of links to the plurality of agency computer systems, the links enabling data exchange between the plurality of agency computer systems; and providing configurable state machines, operative to facilitate data exchange between the plurality of agency computer systems.

The method may further include providing a multi-tenant cloud-based application environment; and providing multiple application instances to a plurality of agency computer systems via the multi-tenant cloud-based application environment. The method may further include providing a single-tenant cloud-based application environment; and providing multiple application instances to a single agency computer system via the single-tenant cloud-based application environment. The method may further include providing the configurable state machines including an accepted state, an acknowledge state, a canceled state, a timeout state, and a declined state. The method may further include providing at least an accepted state in each configurable state machine, when configured. The method may further include indicating that a data object from a sending agency has been accepted by a receiving agency by an accepted state. The method may further include indicating that a data object has been acknowledged to a sending agency by a receiving agency by an acknowledged state.

One disclosed embodiment provides an emergency data exchange architecture that includes a plurality of dedicated cloud servers. Each cloud server corresponds to an agency, and each of the plurality of cloud servers is operative to send and receive emergency incident data objects to and from the other, respectively. The embodiment includes a data rights management component that is operative to access stored rules associated with each of the plurality of dedicated cloud servers, and associated with each of the corresponding agencies, and to grant data access permissions in accordance with the stored rules, prior to transmission of the emergency incident data objects between cloud servers.

The emergency data exchange architecture may further include a client-server application programming interface that is operative to provide an implicit subscription to an agency software system for sharing of emergency incident data objects, without acceptance of subscription requests by the agency software system.

In one embodiment of the emergency data exchange architecture, the client-server application programming interface is further operative to establish a first link to an agency software system for a first data type and a second link to the agency software system for a second data type.

The emergency data exchange architecture data rights management component may further include: an emergency data exchange application program interface for operatively coupling to a plurality of agencies, in which each agency is associated with one of the plurality of dedicated cloud servers. The data rights management component may further include a policy store that is operative to store markup language based data rights management rules.

In one embodiment, the emergency data exchange architecture may further include an emergency date exchange permissions system component that is operative to create rules for data combination permissions and data access permissions for data conveyance between software systems of a specific agency.

The emergency data exchange architecture may further include at least one websocket connection between a dedicated cloud-based server and an agency software system of a corresponding agency. The emergency data exchange architecture may further include a cloud-based application for providing a location information server (LIS) and an additional data repository (ADR) to the agencies.

The present disclosure also provides an emergency data exchange data rights management (DRM) architecture that includes: an emergency data exchange interface; a context handler operatively coupled to the emergency data exchange interface, that is operative to access emergency incident data objects from a plurality of entities, environmental context and emergency incident data object metadata. The DRM architecture also includes a policy store, that is operative to store markup language based data combination and data access rules; a policy decision point, operatively coupled to the policy store and to the context handler, that is operative to access the markup language based data combination and data access rules contained in the policy store; and an emergency data exchange agency store, that is operatively coupled to the context handler, and that is operative to provide agency metadata to the context handler.

Turning now to the drawings wherein like numerals represent like components, FIG. 1 illustrates an emergency data exchange (EDX) 100 in accordance with various embodiments. The EDX 100 is a cloud-based computer system that includes cloud-servers, with each cloud-server including at least one processor, and non-volatile, non-transitory memory that stores executable instructions (code) that when executed by the processor, or processors, provides a multi-tenant cloud-based application environment, a single-tenant cloud-based application environment or a combination of both. The executable instructions, when executed by the processor, or processors, enable the multi-tenant cloud-based application environment to provide multiple application instances to various agency computer systems (such as ECC computer systems). Likewise, the executable instructions, when executed by the processor, or processor, enable a single-tenant cloud-based application environment to provide multiple application instances to a single agency computer system. The EDX 100 utilizes a cloud-based infrastructure and enables interoperability and data exchange and sharing between various disparate entities and agencies and their respective computer systems and software systems. For example a PSAP CAD (Computer-aided Dispatch) system, hospital systems, paramedics, police and monitoring systems, home security and business security systems, telematics systems and mobile devices may all send and receive data objects such as, but not limited to, emergency incident data objects (EIDOs) sent to and received by the EDX and handled using DRM rules and policies set by each agency. An emergency data manager portal, is also provided and may be present at any of the agencies for example at an ECC or PSAP, and can provide Location Information Server (LIS) data, Additional Data Repository (ADR) data, and Identity Searchable ADR (IS-ADR) data to the various agencies under certain circumstances. A LIS is defined by NENA as "a functional element in an IP-capable originating network that provides locations of endpoints (i.e., calling device)." Location may be provided as Location-by-Reference, or Location-by-Value, and, Location-by-Value may be in geo or civic forms. An endpoint may query a LIS its own location, or by queried by another entity for the location of an endpoint. In either case, the NENA standards state that "the LIS receives a unique identifier that represents the endpoint, for example an IP address, circuit-ID or Media Access Control (MAC) address, and returns the location (value or reference) associated with that identifier." NENA defines an ADR (Additional Data Repository) as "a data storage facility for Additional Data" wherein an "ADR dereferences a URI passed in a SIP Call-Info header field or PIDF-LO <provided-by > element and returns an Additional Data object block." An IS-ADR (Identity Searchable Additional Data Repository) is defined by NENA as "an Additional Data Repository that provides a service that can search for Additional Data based on a sip/sips or tel URI: (e.g., Additional Data for the caller)."

Figure 2:
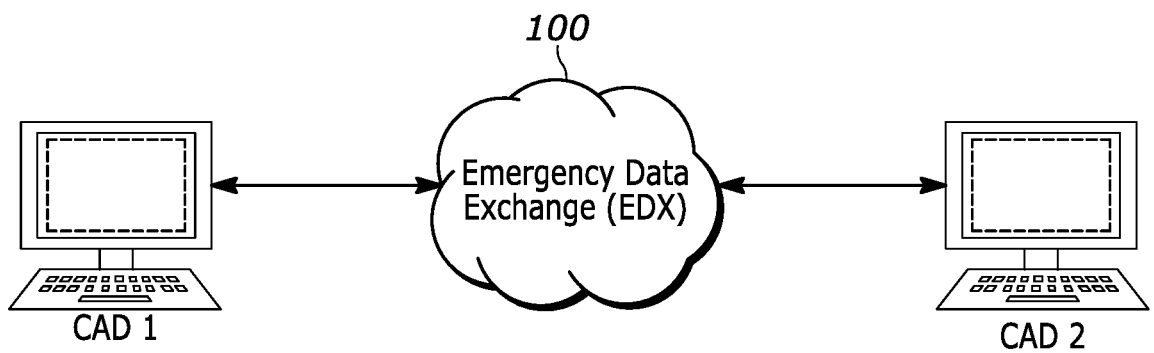
FIG. 2 is block diagram of an Incident Data Exchange (IDX) system in accordance with some embodiments.

FIG. 2 is block diagram of an Incident Data Exchange (IDX) system using the EDX 100 in accordance with some embodiments and illustrates that various CAD systems, which may be operated at different PSAP locations, may share data using by way of data object conveyance (such as EIDO conveyance) to and from the disclosed EDX 100.

Figure 3:
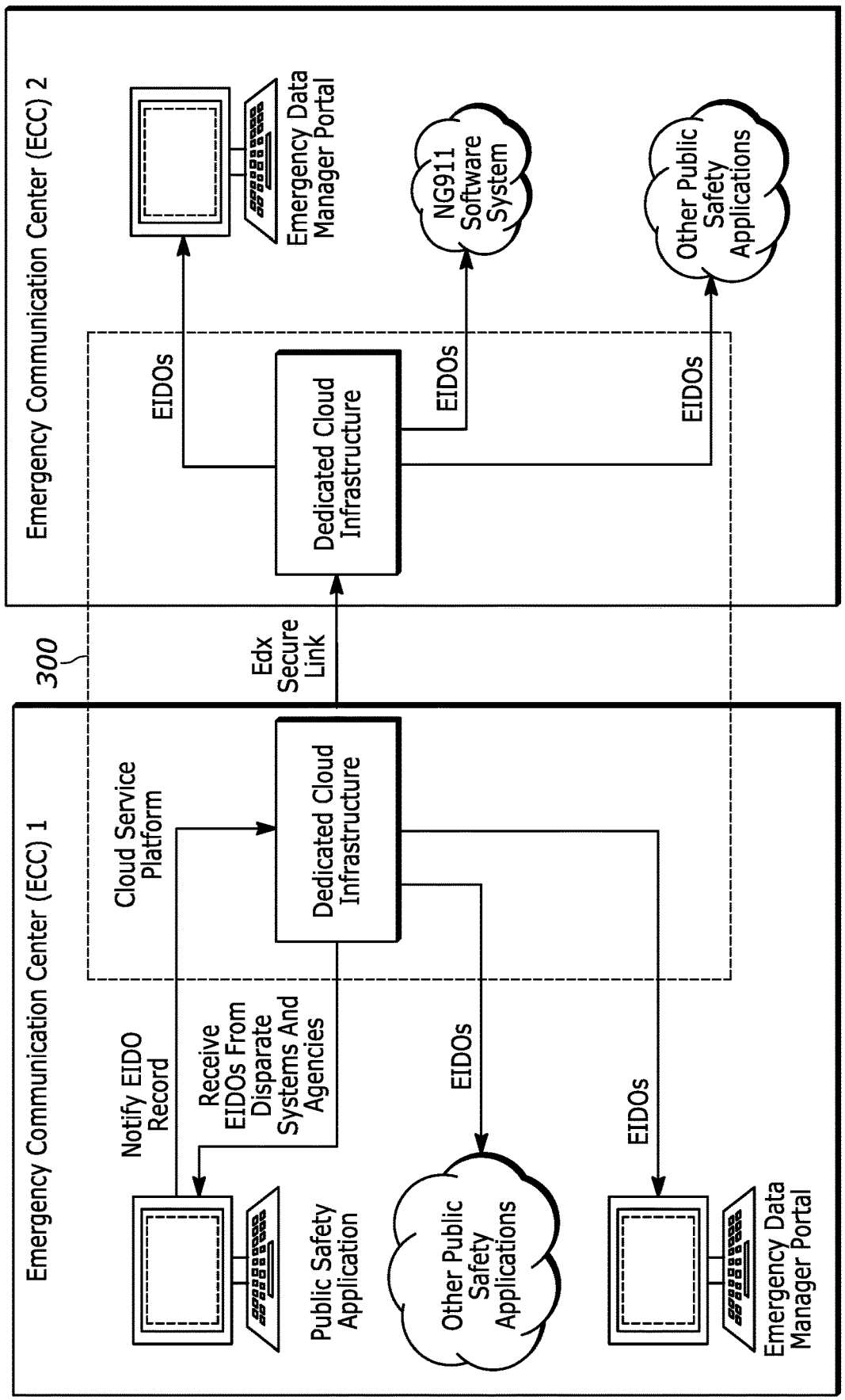
FIG. 3 is diagram of a cloud-based IDX/EDX system in accordance with various embodiments.

FIG. 3 is diagram of a cloud-based IDX/EDX system 300 in accordance with various embodiments, and provides further details of an example architecture. In the example shown in FIG. 3, two emergency communications centers (ECCs) are operative to share data via the disclosed EDX. An ECC is defined by NENA as "A set of call takers operating under common management which receives emergency calls for service and asynchronous event notifications and processes those calls and events according to a specified operational policy." An ECC may be for example, a PSAP (Public Safety Answering Point). NENA defines a PSAP as "an entity responsible for receiving 9-1-1 calls and processing those calls according to a specific operational policy." A "Primary PSAP" is defined per NENA as "a PSAP to which 9-1-1 calls are routed directly from the 9-1-1 Control Office." A "Secondary PSAP" is defined per NENA as "a PSAP to which 9-1-1 calls are transferred from a Primary PSAP." An "Alternate PSAP" is defined per NENA as "a PSAP designated to receive calls when the primary PSAP is unable to do so," and a "Consolidated PSAP" is defined per NENA as "a facility where multiple Public Safety Agencies choose to operate as a single 9-1-1 entity." A "Legacy PSAP" is defined per NENA as "a PSAP that cannot process calls received via i3-defined call interfaces (IP-based calls) and still requires the use of CAMA or ISDN trunk technology for delivery of 9-1-1 emergency calls." NENA further defines a "Serving PSAP" as "the PSAP to which a call would normally be routed," and an "NG9-1-1 PSAP" as denoting "a PSAP capable of processing calls and accessing data services as defined in NENA's i3 specification, NENA NENA-STA-010, and referred to therein as an "i3 PSAP"." The term "agency" or "ECC" may refer to a "PSAP" in accordance with the above definitions. A PSAP is one type of ECC and both an ECC and a PSAP are types of "agencies." NENA states that "in NG9-1-1, an organization that is connected directly or indirectly to the ESInet" is an agency" and that "Public safety agencies are examples of Agency." NENA further states that "an entity such as a company that provides a service in the ESInet can be an Agency" and "agencies have identifiers and credentials that allow them access to services and data." An "agency identifier" is defined by NENA as "domain name for an agency used as a globally unique identifier."

In the example shown in FIG. 3, ECC 1 and ECC 2 may each be an i3 PSAP and each have dedicated cloud servers that are dedicated to their respective accounts with the cloud-based EDX. The cloud servers may be included in a cloud-based system, based on a cloud service such as, but not limited to AWS GovCloud or another appropriate cloud service platform.

In order for an ECC to connect to the EDX, in one example embodiment, a public safety application may send an HTTP POST to the dedicated cloud infrastructure (that includes the dedicated cloud server) as an HTTP POST to the EDX endpoint for EIDOs to be created, updated or both. An HTTP POST webhook receiver endpoint for receiving EIDOs delivered to, or emitted by the agency (ECC) is then built. A "webhook" as used herein refers to a web callback or an HTTP push API. The second agency, i.e. ECC 2 may then receive and send EIDOs from and to ECC 1, respectively via the EDX secure link between the two dedicated cloud infrastructure components. Each EDX enabled ECC receives its own unique URL (Uniform Resource Locator) that directs their API requests to their respective dedicated cloud infrastructure dedicated to their account, in some embodiments. One example ECC URL format may be https://<agencyIdentifier>.edx.rapidsos.com. In a further example, if an agency identifier component of an API URL (such as an i3 agency identifier) has a format such as "psap.somewhere.us," the EDX account URL EDX account may then be https://psap.somewhere.us.edx.rapidsos.com. Other non-ECC agencies that may send and receive data may also have URLs in a similar format. For example, another service provider may have an identifier such as "serviceprovider.name" and have a corresponding API URL such as, for example, https://serviceprovider.name.edx.rapidsos.com, etc.

In order to create an EIDO in the EDC HTTPS interface, an agency such as an ECC may send an HTTP POST request to a URL, for example, https://edx.rapidsos.com/v1/eido with an EIDO payload. To share an EIDO with linked agencies, that agency must specify one or more agencies as items in an agencyComponent list. An example request for creating an EIDO that would be shared with another agency, such as, for example another ECC having an agencyIdentifier of psap.somewhere.us is as follows:

```
POST /v1/eido HTTP/1.1
Host: edx.rapidsos.com
Content-Type: application/json; charset=utf-8
Authorization: Bearer YOUR_TOKEN
{
    ...
    "agencyComponent": [
        ...
        {
            "$id": "psap.somewhere.us",
            "lastUpdateTimeStamp": "2022-02-02T21:15:49.287Z",
            "updatedByAgency Reference": {
                "ref": "psap.somewhere.us"
            },
            "updatedByAgentReference": {
                "ref": "john.doe@psap.somewhere.us"
            },
            "agencyRoleDescriptionRegistryText": [
                "Assisting"
            ],
            "incidentOwningAgencyIndicator": false,
            "agencyType": [
                "urn:service:sos"
            ],
            "notesReference":[ ]
        },
        ...
    ],
    ...
}
```

EIDO Creation. In accordance with the various embodiments, an HTTP POST request to create an EIDO may be performed using various code implementations. In one example, and HTTP POST request to create an EIDO may be accomplishing using Python code. One example of making the HTTP POST request to create an EIDO using Python code is the following:

```
"'python title="create_eido.py" lineNumbers import requests
eido = {...} response = requests.post( 'https://edx.rapidsos.com/v1/eido',
json=eido, headers={'Authorization': f'Bearer {access_token}'} ) assert
response.ok
<!-- theme: info -- >
```

Receiving Emergency Data: In order to receive incidents and updates from the EDX and its other clients, an agency must create a web service capable of receiving HTTP POST requests containing EIDOs. The agency must meet the webhook receive endpoint requirements by implementing an interface per the following example:

```
Protocol: HTTPS
Method: POST
Request Headers
- X-RapidSOS-Signature
Request Body: (Per the API Schema).
```

Webhook Signature Validation. In order to verify that webhook payloads that are received by an agency endpoint were actually sent by the EDX, the agency will validate the signature value in the EDX signature HTTP header (for example X-RapiSOS-Signature HTTP header). In one example, the signature value is generated using the HMAC-SHA1 hash of the payload using the agency's client secret of the agency's client credentials as the secret key.

In addition to validating the signature, the agency may, in some embodiments, also validate the freshness of the "timestamp" attribute in the payload. In one example, to properly allow for differences in server time, the agency may check that the "timestamp" value is no older than 60 seconds, where "timestamp" is, for example, a millisecond-precise UNIX timestamp.

Example Webhook Request. An example webhook request that may be sent to an agency webhook receiver endpoint when an EIDO is sent to the agency EDX account is as follows:

```
''' http
POST /my-webhook-receiver HTTP/1.1
Host: myapi.com
Content-Type: application/json; charset=utf-8
X-RapidSOS-Signature: 4cbed3d3e2f690e69f7424ca4b5c60eeedac2958
{
    "event_type": "incident",
    "timestamp": 1634926783861,
    "body": {... eido ...}
}.
```

Code Example. A Python code (executable instructions) example of a web server implementing an EDX webhook receiver endpoint that validates the signature and timestamp of the request is as follows (comments to aid in understanding the example code are preceded by "#"):

```
'''python title="edx_webhook_handler.py" lineNumbers import hashlib import hmac
import time from flask import Flask, request
app = Flask(name)
@app.route('/') def handle_edx_webhook( ):
# Parse the payload and calculate the signature
value payload = request.get_data( ) calculated_signature = hmac.new(SECRET_KEY,
payload, hashlib.sha1).hexdigest( )
# Parse the expected signature value from the EDX signature header (such as, for example,
X-RapidSOS-Signature header)
expected_signature = request.headers['X-RapidSOS-Signature'].encode( )
# Compare the signature values to validate the request
valid_signature = hmac.compare_digest(calculated_signature, expected_signature)
# Check if the timestamp value of the payload is within 60s of current time
payload = request.get_json( )
timestamp = payload['timestamp']
now_ms = int(time.time( ) * 1000)
valid_timestamp = (now_ms − timestamp) < 60000
# Check if both validations pass and process EIDO if so
if valid_signature and valid_timestamp:
# Logic for handling EDX events in the agency's application
...
```

Registering An Agency Webhook as an Integration. Subsequent to an agency having created a webhook that conforms to the requirements for the EDX, the agency must register that URL to EDX as an Integration. To create an integration, the agency may make an HTTP POST request to the EDX, for example, https://edx.rapidsos.com/v1/integrations, with a JSON payload with the following attribute:

- urls - The URLs that will receive data from the EDX (In most cases will
solely be the agency webhook URL).
- clientId - The client id of the credentials that the integration was created for.
- functionalElementType - The type of Public Safety Application that the integration is for.

An example payload is as follows:

```
'''http
POST /v1/integrations HTTP/1.1
Host: edx.rapidsos.com
```

```
Content-Type: application/json; charset=utf-8
Authorization: Bearer YOUR_TOKEN
{
"urls": ["https://my-webhook-receiver/"],
"clientId": "abc-123-xyz-456",
"functionalElementType": "cad"
}
```

Code Example. An example using Python code to make the HTTP POST create an integration is the following:

```
''' python title="create_edx_integration.py"
lineNumbers import requests
integration_payload = { 'urls': ['https://my-webhook-receiver/'],
'clientId': 'abc-
123-xyz-456', 'functionalElementType": 'cad' }
response = requests.post(
'https://edx.rapidsos.com/v1/integrations',
json=integration_payload,
headers={'Authorization': f'Bearer {access_token}'} )
assert response.ok '''
```

In another example embodiment, a websocket connection is maintained by each entity of the ECC to the EDX websocket endpoint and once connected, the client entities may use subscribe and unsubscribe actions to control the flow of data from the EDX to their applications. In an example embodiment using websockets, there are two subscription types: "single," which subscribes for all updates to a particular incident by its incident identifier and "new," which subscribes for new incidents to the extent the subscriber is permitted to receive them under DRM policy rules. The Websocket Protocol is defined by the Internet Engineering Task Force (IETF) Request for Comments (RFC) 6455 (December 2011). The IETF RFC 6455 states that the "WebSocket Protocol enables two-way communication between a client running untrusted code in a controlled environment to a remote host that has opted-in to communications from that code." The IETF RFC 6455 further states that "the security model used for this is the origin-based security model commonly used by web browsers" and that "the protocol consists of an opening handshake followed by basic message framing, layered over TCP" where "the goal of this technology is to provide a mechanism for browser-based applications that need two-way communication with servers that does not rely on opening multiple HTTP connections (e.g., using XMLHttpRequest or <iframe>s and long polling)." Thus, in this example embodiment using the Websocket Protocol, the HTTP POST procedure of the first example embodiment example described above is not required.

Connecting to the Data Exchange API. An ECC or other agency may use its client credentials to generate an authentication token. The agency may then construct a websocket handshake request using the websocket client technology of its choice that includes a header having name "Authorization" and the value "Bearer." The agency will then retrieve a token for example "YOUR_TOKEN." An example request message and an example response message may have the following formats:

```
Request
GET /v1/eido/subscribe HTTP/1.1
Host: psap.anywhere.us.edx.rapidsos.com
Authorization: Bearer YOUR_TOKEN
Connection: Upgrade
Upgrade: websocket
Response
HTTP/1.1 101 Switching Protocols
Connection: upgrade
Upgrade: websocket
```

After a WebSocket connection is established, the agency may then use the Data Exchange API interface to establish subscriptions for data, and send data objects (such as EIDOs in one example embodiment) to the EDX.

Data Exchange API Actions. In some embodiments, the Data Exchange API may be a NENA EIDO Conveyance Conformant API that allows clients to subscribe to emergency incidents within their EDX account, and notify their EDX account of new and updated emergency incidents within their data jurisdiction. A data jurisdiction of an agency EDX account is configured via a Links API, which functionally subscribes peer EDX accounts to each other.

The "subscribe" API action applies an EIDO subscription to the client WebSocket connection. A subscription ID is provided back in an Acknowledgement to be used for subscription management. Within the subscribe API action schema, a "requestId" is a required string that is a client generated globally unique identifier (GUID) for the request that will be returned by the EDX in the response. A "requestType" is a required string that specifies the type of request. A "requestSubType" is a required string that provides for different actions based on the requestType specified. An "incidentId" is a required string that is required if the request type is EIDO and the subtype is single, otherwise the incidentID is omitted. The "incidentID" is the incident tracking identifier associated with the incident.

Subscribe API Action Examples. A first example of the subscribe API action is to subscribe for new data objects (such as EIDOs) in an agency's EDX account. The client will be notified of all open EIDOs in the agency's EDX account as well as any new EIDOs in the agency's EDX account for the duration of the subscription. An example of this subscribe API action is as follows:

```
{
"subscribe": {
"requestId": "d5db34e4-98b0-4ea9-8f22-124bddb0eb8f",
"requestType": "EIDO",
"requestSubType": "new",
}
}.
```

An example subscribe API action to subscribe for all updates to example incident urn: emergency:uid:incidentid: df0cd6ff-46bf-44aa-bbee-e9daa5dacf9d:psap.anywhere.us is as follows:

```
{
"subscribe": {
"requestId": "84367b0a-7a27-44fc-b3b4-6a8d1912d3e9",
"requestType": "EIDO",
"requestSubType": "single",
"incidentId": "urn:emergency:uid:incidentid:df0cd6ff-46bf-44aa-
bbeee9daa5dacf9d:
psap. anywhere. us"
}
}.
```

The "Unsubscribe" API action removes an EIDO subscription. Within the unsubscribe API action schema, the "requestId", similar to the subscribe API action schema, is a client generated globally unique identifier (GUID) for the request that will be returned by the EDX in the response. The "subscriptionId" is a required string that specifies the ID of the Subscription to be removed. An example unsubscribe API action to unsubscribe from example subscription sub1234 is as follows:

```
{
"unsubscribe": {
"requestId": "10bdc953-352f-4824-bcfd-c5d2de36a36c",
"subscriptionId": "sub1234"
}
}.
```

The "Event" API Action is the API action with which EIDO data is sent to, or received from the agency's EDX. Within the event API action schema, a "subscriptionId" is a conditional string identifying the event notification trigger (i.e. the ID of the subscription that caused the notification) and is contained in events received from the EDX. Events sent to the EDX may omit the subscriptionId. Notifications from the API client will not contain this value, as stated in the condition, as the client is not required to implement subscription handling from EDX. A "requestId" is a required string and that is a client generated globally unique identifier (GUID) for the request that will be returned by the EDX in the receiver in an acknowledgement. If the receiver is not the agency's EDX (i.e. the client), acknowledgement is optional. Acknowledgments allow the receiver to respond with an error to trigger a retry request, or an affirmative acknowledgment to confirm receipt. A "notification" is a required list which is an array of objects matching the requestType of the subscription that triggered the notification. An event API action to publish an EIDO notification to the agency EDX is the following:

```
"event": {
"requestId": "767c28e5-69d8-4bc0-b134-734723dd9fe6",
"notification": [
{...eido...}
]
}
}.
```

An event API action to receive a notification from the agency EDX for an example subscription sub1234 is the following:

```
{
"event": {
"subscriptionId": "sub1234",
"requestId": "767c28e5-69d8-4bc0-b134-734723dd9fe6",
"notification": [
{...eido...}
]
}
}.
```

The "Terminate" API action is a notification that the agency EDX has terminated a subscription. Subscriptions may be terminated due to, for example, server-side error, modifications to permissions (i.e. the agency is no longer allowed to receive data from the incident in question), etc. Within the terminate API action schema, "subscriptionId" is a required string that provides the ID of the subscription to terminate. A "requestId" is a required string that is the generated GUID for the request. An example of a terminate API action for when an agency EDX has terminated example subscription sub1234 is as follows:

```
{
"terminate": {
"subscriptionId": "sub1234",
"requestId": "289cffcb-5c0c-4d71-949f-4931e97d71f0"
}
}.
```

WebSocket Examples. The following examples assume the client is able to authenticate and connect to an EDX WebSocket. The following examples describe the messages that are required to be sent over connected websockets to accomplish a particular functionality.

A websocket example to consume all incident data from an agency's EDX is the following. The first step is to connect, that is, establish a websocket connection and then the second step is to subscribe for new EIDOs by creating a subscription for new and open EIDOs. An example of the first step is the following:

```
{
"subscribe": {
"requestId": "d5db34e4-98b0-4ea9-8f22-124bddb0eb8f",
"requestType": "EIDO",
"requestSubType": "new",
}
}.
```

The following example subscribes for updated EIDOs (i.e. for each unique EIDO received, subscribe to it):

```
{
"subscribe": {
"requestId": "84367b0a-7a27-44fc-b3b4-6a8d1912d3e9'",
"requestType": "EIDO",
"requestSubType": "single",
"incidentId": "urn:emergency:uid:incidentid:df0cd6ff-46bf-44aa-bbeee9daa5dacf9d:
psap.anywhere.us"
}
}.
```

The next example is to accept events:

```
{
"event": {
"subscriptionId": "sub1234",
"requestId": "767c28e5-69d8-4bc0-b134-734723dd9fe6",
"notification": [
{...eido...}
]
}
}.
```

If the agency application wishes to stop receiving events from particular incidents, it may use "unsubscribe" from the single subscriptions as in the following example:

```
{
"unsubscribe": {
"requestId": "10bdc953-352f-4824-bcfd-c5d2de36a36c",
"subscriptionId": "sub1234"
}
}.
```

If the agency application wishes to stop receiving new events, it may "unsubscribe" from the new subscription as in the following example:

```
{
"unsubscribe": {
"requestId": "10bdc953-352f-4824-bcfd-c5d2de36a36c",
"subscriptionId": "sub1234"
}
}.
```

Termination Handling. If an agency application receives a terminate event for a subscription, it must re-create the subscription, however, if the agency application re-creates terminated subscriptions, the application must track the subscriptions that is has made to the agency's EDX. An example termination message is as follows:

```
{
"terminate": {
"subscriptionId": "sub1234",
"requestId": "289cffcb-5c0c-4d71-949f-4931e97d71f0"
}
}.
```

An example re-subscription message (after termination) is as follows:

```
{
    "subscribe": {
        "requestId": "84367b0a-7a27-44fc-b3b4-6a8d1912d3e9",
        "requestType": "EIDO",
        "requestSubType": "single",
        "incidentId": "urn:emergency:uid:incidentid: df0cd6ff-46bf-44aa-
        bbeee9daa5dacf9d: psap.anywhere. us"
    }
}.
```

The EDX may also provide an emergency data manager portal, via a websocket connection, to each of the ECCs in which the portal provides and displays LIS data and IS-ADR data based on EIDOs received from the respective ECC. The emergency data manager portal represents an instance of a cloud-based application which may be provided by the multi-tenant cloud-based application environment in some embodiments, or by a single-tenant cloud-based application environment in other embodiments. An emergency data manager service application hosted in the cloud service platform, for example, may use identifying information in the EIDO to push LIS and ADR (or IS-ADR) data to the portal at the relevant ECC. EIDOs containing information shown in the portals may be shared with the other ECC provided that the policy rules for the specific data is observed (i.e. the DRM relevant to the specific data). Other data objects (i.e. incident data or incident data objects) may also be utilized in some implementation that are not yet fully upgraded to receive and send data objects in the EIDO format.

Once a link between an ECC and the EDX is established, in any of the above-described embodiments, EIDOs may be shared among NG9-1-1-software systems, other public safety applications, the EDM portal (and EDM server in the cloud infrastructure) and public safety applications such as CAD, etc.

Figure 4:
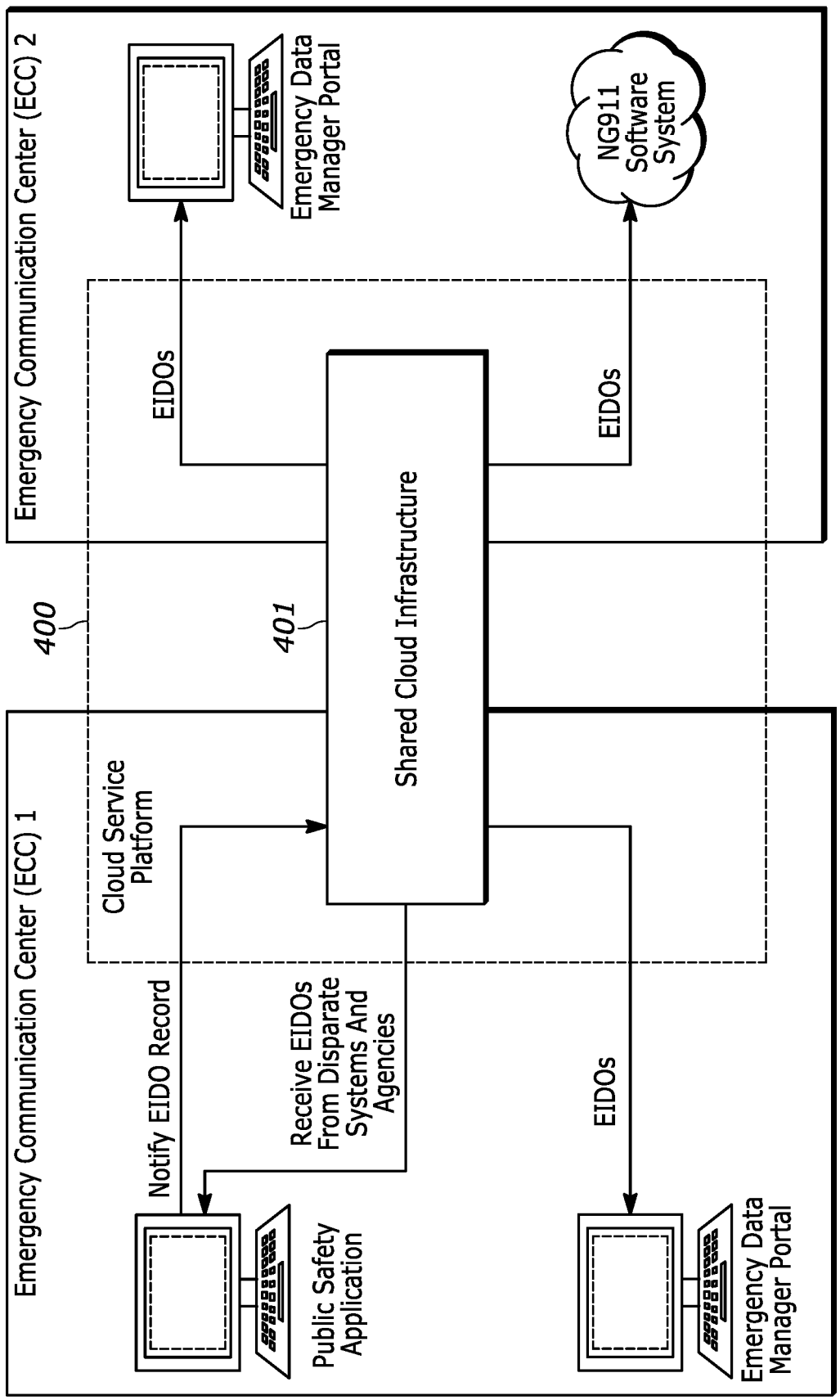
FIG. 4 is diagram of a cloud-based IDX/EDX system in accordance with various embodiments.

FIG. 4 is diagram of another cloud-based IDX/EDX system 400 in accordance with various embodiments in which a shared cloud infrastructure 401 is used for both example ECCs. An ECC may establish a link with the EDX using the same two example connection procedures described above with respect to the FIG. 3 example EDX embodiments. The shared cloud infrastructure 401 is one example of utilization of a multi-tenant application environment.

Figure 5:
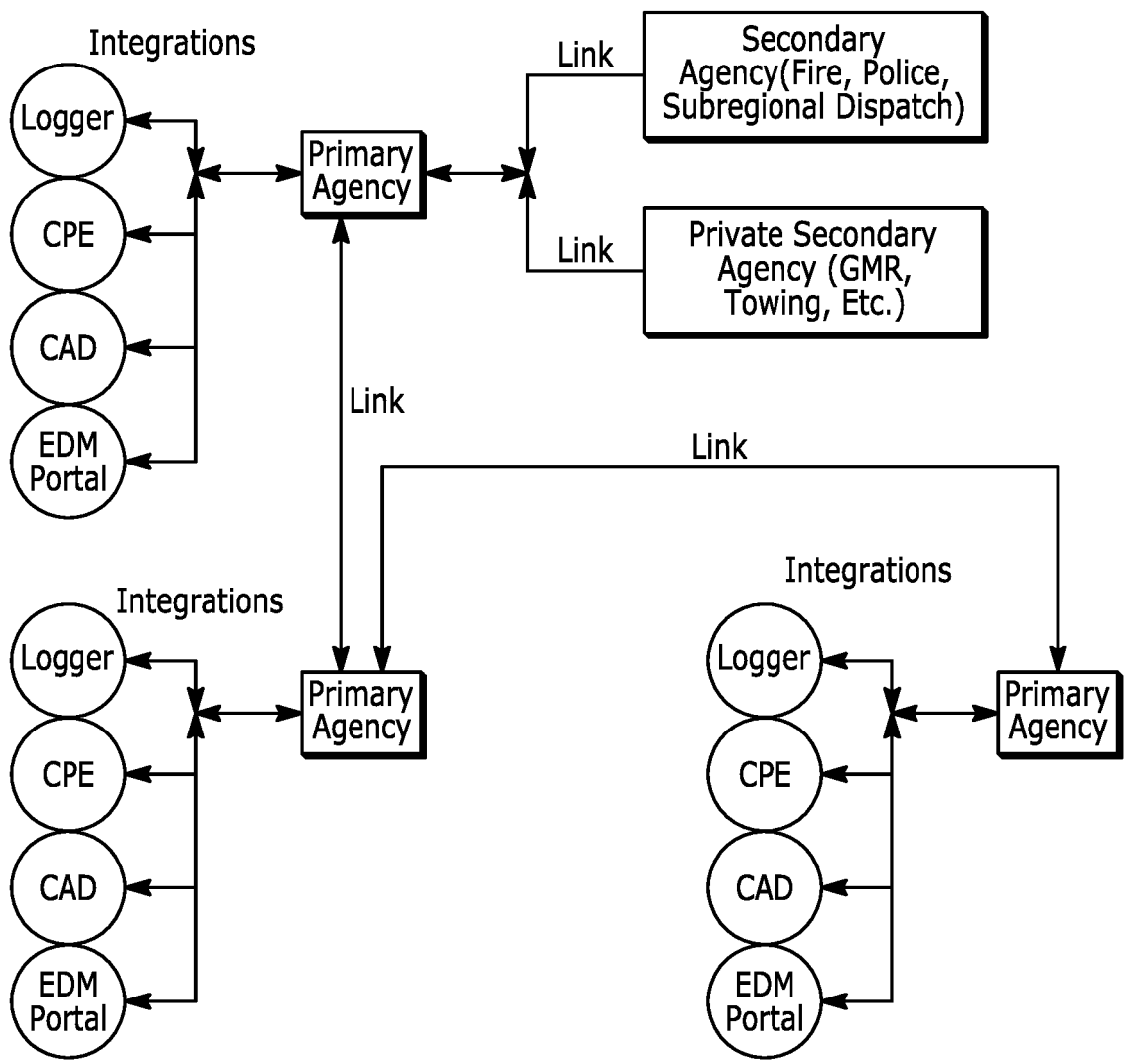
FIG. 5 is a diagram of EDX/IDX linking between various agencies, such as PSAPs and other agencies, in accordance with various embodiments.

FIG. 5 is a diagram of EDX/IDX linking between various agencies, such as PSAPs and other agencies, in accordance with various embodiments. In the example of FIG. 5, each primary agency is a peer agency and each of the agencies are linked to each other in order to share EIDOs. The first primary agency is also linked to a secondary agency and to a private secondary agency. The primary agencies each include applications (which may be referred to as "interoperable software systems") such as a data logger (EIDO logger), call processing equipment (CPE), computer-aided dispatch (CAD) and an emergency data manager (EDM) portal. Each of these applications may send and receive incident data, for example EIDOs, as appropriate, in accordance with any required DRM policy rules. The EDX examples in FIG. 3 and FIG. 4 maintain a policy store that contains the DRM policy rules and applies them as incident data objects (which may be EIDOs) are conveyed among or between the various interoperable software systems.

In order for the various agencies to receive and share incident data, the links must be established to each agency to which data is to be sent and received, and that agency must accept and enable the link. This handshaking process must occur prior to configuration of interoperation between disparate agencies. In one example embodiment, a link may be created by the agency making an HTTP POST request with a JSON payload having an attribute for example "requested. $id" with the agency ID of the entity/agency to which incident EIDOs are to be sent and received from. In another example embodiment, the websocket protocol is used and one or more websocket connections are established. Once the links are established, EIDOs may be sent and received between linked agencies but the EIDOs must comply with the appropriate DRM policy rules.

In some embodiments, the links may be granular in that a separate link is established for handling a certain type of data. For example, an agency may need to establish one link to receive police related EIDO conveyances and may need another link to receive medical related EIDO conveyances. However, in a first example embodiment, only a single link is required to receive any type of EIDO for any type of agency, etc. provided that the DRM rules and policies for the agency owner of the EIDO data are enforced.

EDX Agency Linking. In order for an agency, such as an ECC, to be eligible to receive and share incident data with other agencies, that agency must establish a link between itself and the other agency on the EDX network. That link must be accepted and enabled by the requested agency that the first agency has created the link with to begin exchanging data. This "handshake" is the first step when configuring interoperation between disparate EDX agencies.

Requesting a New Link to a Peer Agency. An agency may create a link by making an HTTP POST request to the EDX URL, for example, https://edx.rapidsos.com/v1/links with a JSON payload with the attribute "requested.$id" which is the agency ID of the EDX entity that the agency wants to receive incidents from and send incidents to. An example payload is as follows:

```
POST /v1/links HTTP/1.1
Host: edx.rapidsos.com
Content-Type: application/json; charset=utf-8
Authorization: Bearer YOUR_TOKEN
{
"requested": {
"$id": "psap.somewhere.us"
}
}.
```

Code Example. An example of making the HTTP POST request to create a pending link from a first agency to a second agency using Python code is as follows:

```
'''python title="create_edx_link.py"
lineNumbers import requests
link_payload = { 'requested': { '$id': 'psap.somewhere.us' } } response =
requests.post(
'https://edx.rapidsos.com/v1/links', json=link_payload,
headers={'Authorization':
f'Bearer {access_token}'} ) assert response.ok
<!-- theme: info -- >.
```

Accepting Links from other EDX Agencies. Other agencies will not receive incident data even if they are specified in the ' agencyComponent' of the EIDO unless they have "'ENABLED'" links from the agency sending the EIDO to them. In order to create an enabled link, the following must occur: 1. The requesting agency must have created a link specifying the sending agency account as the 'requested' agency; 2. The requesting agency must accept this link by setting its status to 'ENABLED'. Enabling a link begins by accepting a link for emergency data by making an HTTP PATCH request to the EDX URL, for example, https://edx.rapidsos.com/v1/links/{link-id} with a JSON payload containing the following attribute "requested.linkStatus" which is a string indicating the status to update the link to. This attribute is to be "ENABLED" when accepting a subscription or "DISABLED" when pausing a subscription. An example payload is as follows:

```
'''http
PATCH /v1/links/1 HTTP/1.1
Host: edx.rapidsos.com
Content-Type: application/json; charset=utf-8
Authorization: Bearer YOUR_TOKEN
{
"requested": {
"linkStatus": "ENABLED"
}
}.
```

Code Example. An example of making the HTTP PATCH request to accept a subscription for EIDOs from another agency using Python code is as follows:

```
'''python title="accept_edx_link.py"
lineNumbers import requests
accept_link_payload = { 'requested': { 'linkStatus':
'ENABLED' } } response =
requests.patch(
'https://edx.rapidsos.com/v1/links/1', json-accept_link_payload,
headers={'Authorization': f'Bearer {access_token}'} )
assert response.ok '''
```

Figure 6:
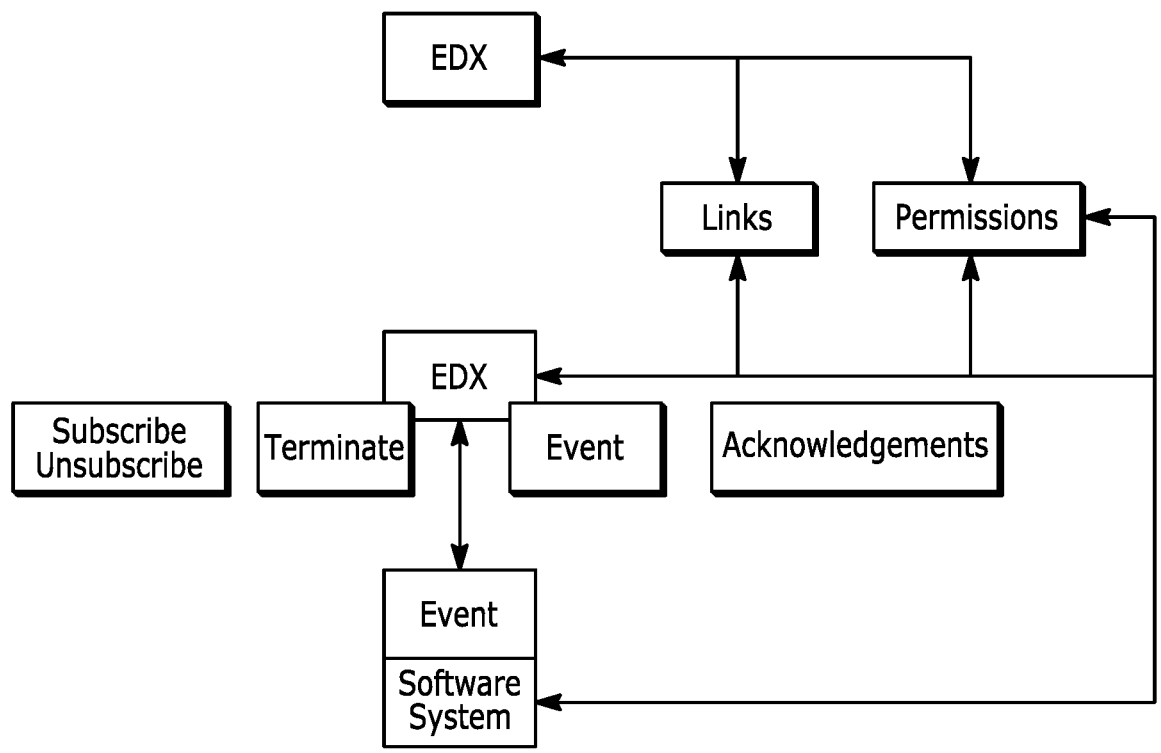
FIG. 6 is a diagram of an IDX/EDX architecture for EIDO conveyance in accordance with various embodiments.

FIG. 6 is a diagram of an IDX/EDX architecture for incident data object conveyance in accordance with various embodiments. The incident data objects may be EIDOs in one example embodiment. The example EDX architecture of FIG. 6 includes agency links that provide incident data object access from one agency to the EDX enabling access to incident data objects and sharing. Permissions are maintained in a policy store to control how incident data objects are shared, received and transmitted between the linked agency and the EDX and between and among various disparate linked agencies.

In the example of FIG. 6, the EDX exposes the interface to the software system, which may be a PSAP software system, for subscribing to events for with incident data objects will be sent or received over a websocket. The interface is an API (application programming interface) providing subscribe/unsubscribe, terminate, event and acknowledgements however this API is not necessary on the software system side (i.e. client side). NENA defines an API as a set of routines, protocols, and tools for building software applications, where the API specifies how software components should interact and APIs may be used when programming graphical user interface (GUI) components."

The EDX maintains configurable policies in permissions such that multiple agencies may send data to the EDX, and the EDX performs coalescence of data and redistribution of data using incident data objects as the data exchange format. In the example embodiment illustrated in FIG. 6, the API is a client-server relationship, where the client-side software system (such as a PSAP software system) implicitly has a subscription, such that the software system can send the EDX information without having a like API on the client-side. In other words, in the EDX architecture example shown in FIG. 6, the software system only needs to send data (i.e. convey incident data object such as, for example, EIDOs) but does not need to implement an identical API for accepting subscription requests. The software system may just assume that the EDX is interested in any data wished to be shared.

The example embodiment shown in FIG. 6 saves the client-side software system from having to listen for the EDX to send subscription messages. In other words, subscription messages do not require the client-side to service that subscription, but instead only have to convey incident data objects (i.e. send data to the EDX). No acknowledgements are required from the client-side software system in the FIG. 6 example embodiment.

The client-side must configure permissions which control how the client-side agency wants its data to be used and distributed. The EDM portal shown in FIG. 1, FIG. 3 and FIG. 4 may provide a graphical user interface (GUI) through which an agency may configure permissions. The EDX collects the permissions into the central place (i.e. permission block) and includes "combination permissions" (for incident data objects sent from Interoperable Software Systems to ECC IDX) and "data access permissions" (for incident data objects sent from the ECC IDX to Core Services for other agency access). Combination permissions control how data from the different software systems at the ECC are combined, and data access permissions control which other entities or agencies are allowed to see which pieces of information.

In one embodiment, every software component of a system (i.e. every software system of an agency) must have equal data access rights. However, in another embodiment, permissions can be created that control how data is shared between software systems within an agency. For example, a CAD system may have permissions that enable some data to be shared with another CAD system, or with the EDM portal application, but may not share data that is proprietary data (i.e. agency level permissions). These agency level permissions may, in an embodiment, be configurable via a cloud-based application portal such as the EDM portal which may provide a GUI for agency level permission creation. In any permission configuration, a preregistration component informs the EDX of all resources that are available from the agency in order to enable operability.

Figure 7:
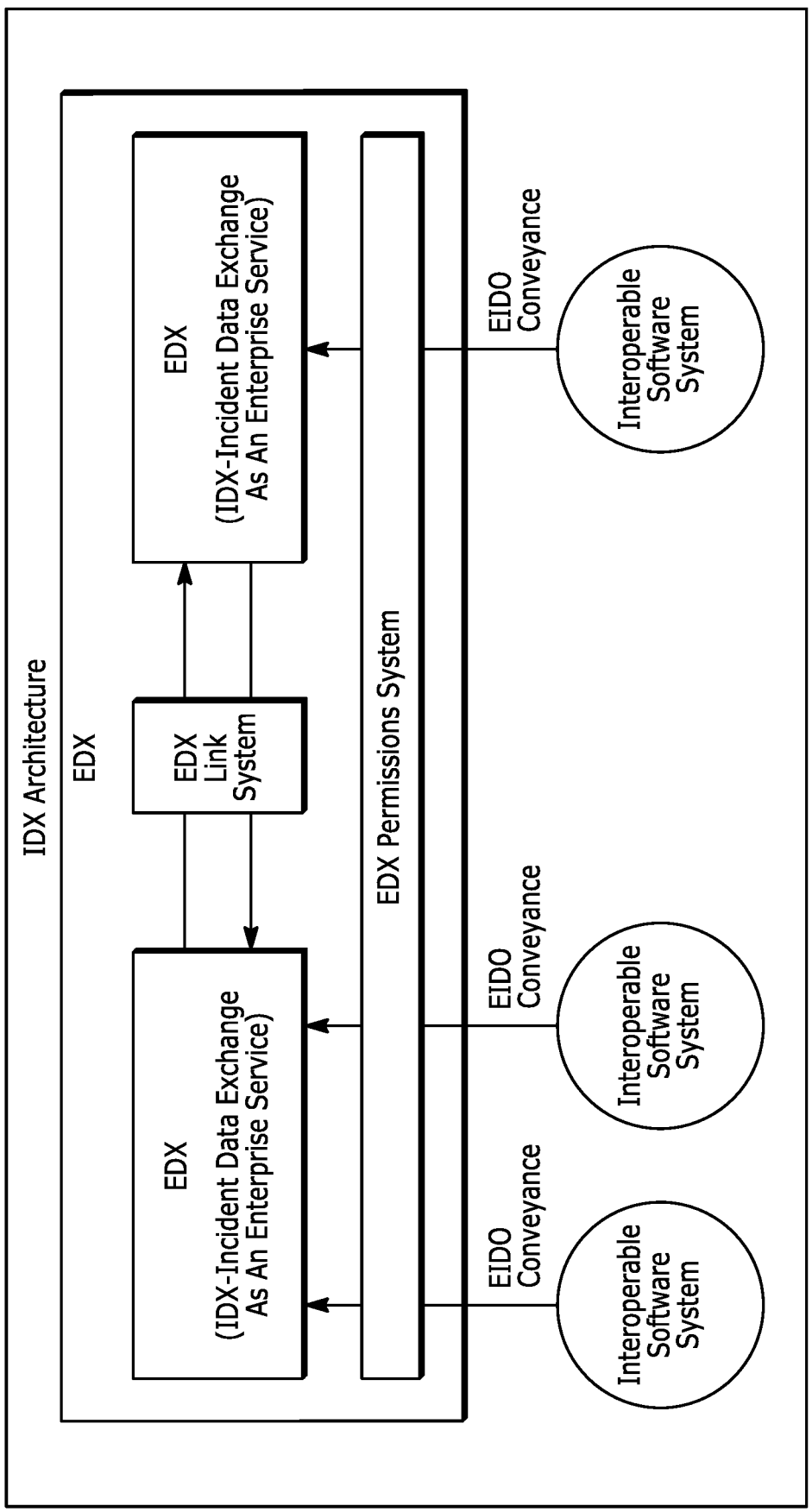
FIG. 7 is a diagram of an IDX/EDX architecture for EIDO conveyance with EDX granular permissions at the interoperable software system level in accordance with various embodiments.

FIG. 7 is a diagram of an IDX/EDX architecture for EIDO conveyance with EDX granular permissions at the interoperable software system level in accordance with various embodiments. The FIG. 7 example provides an example embodiment for providing agency level permissions in order to control DRM at the interoperable software system level. The system architecture in this example provides incident data exchange as an enterprise service with an EDX permission system underlying the data object conveyance architecture. Each agency may create DRM permissions using the EDX permissions system, for example via a software-as-a-service cloud-based application portal and the EDX system stores the permissions in a policy store for that level. Each EIDO conveyance is then checked against the policy store prior to sharing data with other interoperable software systems. Any combination permissions are applied first, then the agency-level, or interoperable software system level permission are applied as a filtering mechanism to remove any non-sharable data from the data object prior to sharing with the subscribed other interoperable software system. These permissions can therefore function to control information sharing within an agency for interoperable software system to interoperable software system data object conveyances.

Figure 8:
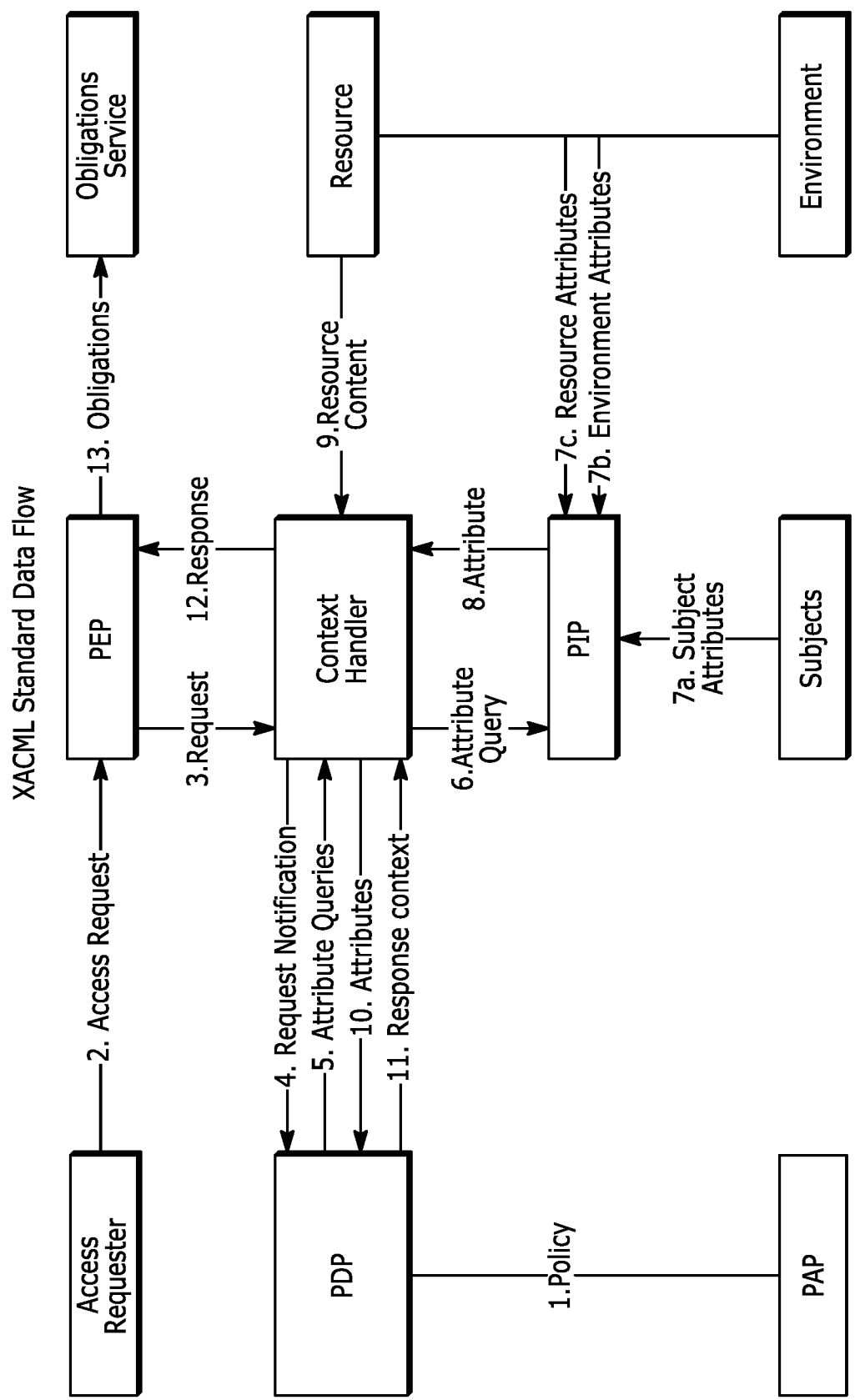
FIG. 8 is a known data flow model according to an XACML standard.

FIG. 8 is a known data flow model according to an XACML standard for DRM rules and policies. A rule is a target, an effect and a condition. A rule is a component of a policy. A policy is a set of rules, an identifier for the rule-combining algorithm and an optional set of obligations. A policy may be a component of a policy set. The standard defines a Policy decision point (PDP), Policy enforcement point (PEP), Policy Information Point (PIP), and a Policy administration point (PAP). The PAP is the system entity that creates a policy or policy set. An access requester makes a data request which is routed to a PEP. Requests and responses are sent and received, from and to the PEP, respectively, via a context handler which couples the PEP, PDP, PIP, and resources and environment. The context handler receives the requests and sends the response to the PEP which is the system entity that performs access control and makes decision requests and enforces authorization decisions. The PDP reviews the requests for consistency with the policies stored in the PAP which is the system entity that creates a policy or policy set, in other words the PDP is the system entity that evaluates applicable policy and renders an authorization decision. Policy Information Point (PIP) is the system entity that acts as a source of attribute values, where an attribute is a characteristic of a subject, resource, action or environment that may be referenced in a predicate or target. A predicate is a statement about attributes whose truth can be evaluated and a target is a set of decision requests, identified by definitions for resource, subject and action, that a rule, policy or policy set is intended to evaluate. A subject is an actor whose attributes may be enforced by a predicate. Thus, a named attribute is a specific instance of an attribute, determined by the attribute name and type, the attribute holder identity (which may be of type: subject, resource, action or environment) and may optionally include the identity of the issuing authority. Obligations are an operation specified in a policy or policy set that should be performed by the PEP in conjunction with the enforcement of an authorization decision. If all rules and policies are met and obligations have been performed, then a resource, which is data, or a service or system component, is accessed by the access requester.

Figure 9:
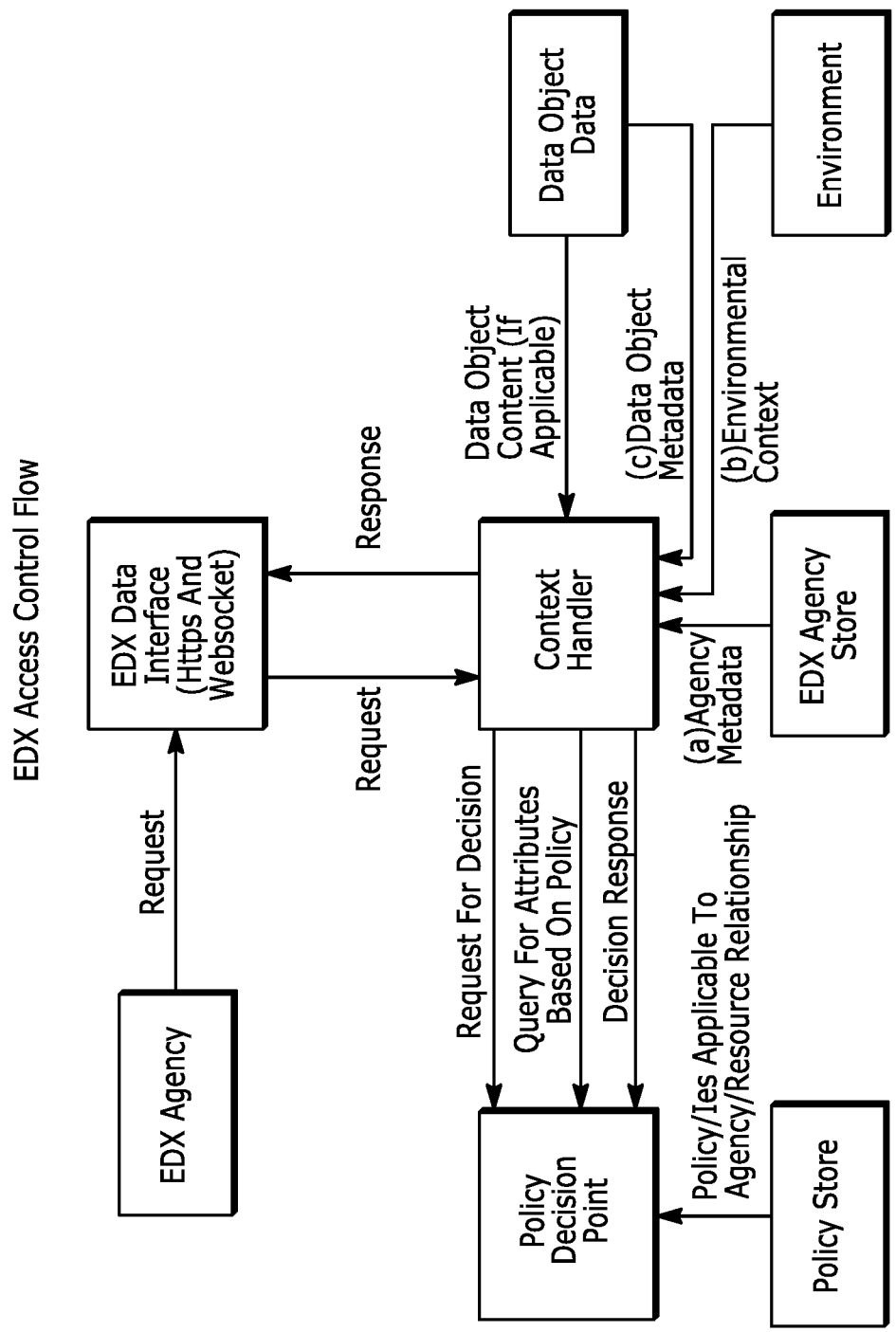
FIG. 9 is a data flow model for an EDX in accordance with various embodiments.

FIG. 9 is a data flow model for an EDX in accordance with various embodiments. The data model illustrated in FIG. 9 may be used for DRM and data object (including, but not limited to, EIDO) conveyance access control in conjunction with the EDX embodiments described above with respect to FIG. 1 through FIG. 7. In the example data model, An EDX agency acts as an access requester and sends requests to the EDX data interface (API) and the EDX acts as the PEP by performing access control and making decision requests and enforcing authorization decisions. The context handler is coupled to the EDX and couples the EDS to the data object data as a resource and to the environment. The context handler however receives data object metadata and environmental context rather than having an intermediary PIP. Agency metadata is sent from an agency store to the context handler.

The policy store acts analogously to the PAP and provides rules and policies to the PDP. The context hander sends requests for decision, queries for attributes based on policy stored in the policy store, and decision responses to the PDP. Assuming all rules and policies are met the response is provided to the EDX data interface and the EDC agency is granted data object conveyance if appropriate, or otherwise denied if the rules and polices dictate.

Therefore, the example data flow model show in FIG. 9 enables data object DRM in the various architecture embodiments disclosed above. The data flow model employs markup language based rules and polices, such as XML, XACML, to extent this formatting is required for EIDO i3 format, however the data model of XACML DRM is modified in accordance with the example of FIG. 9 for the various embodiments.

FIG. 10 are example syntaxes used in the data object conveyance architecture interface/API in accordance with various embodiments. For example, subscribe, unsubscribe, terminate and event examples are shown.

Figure 11:
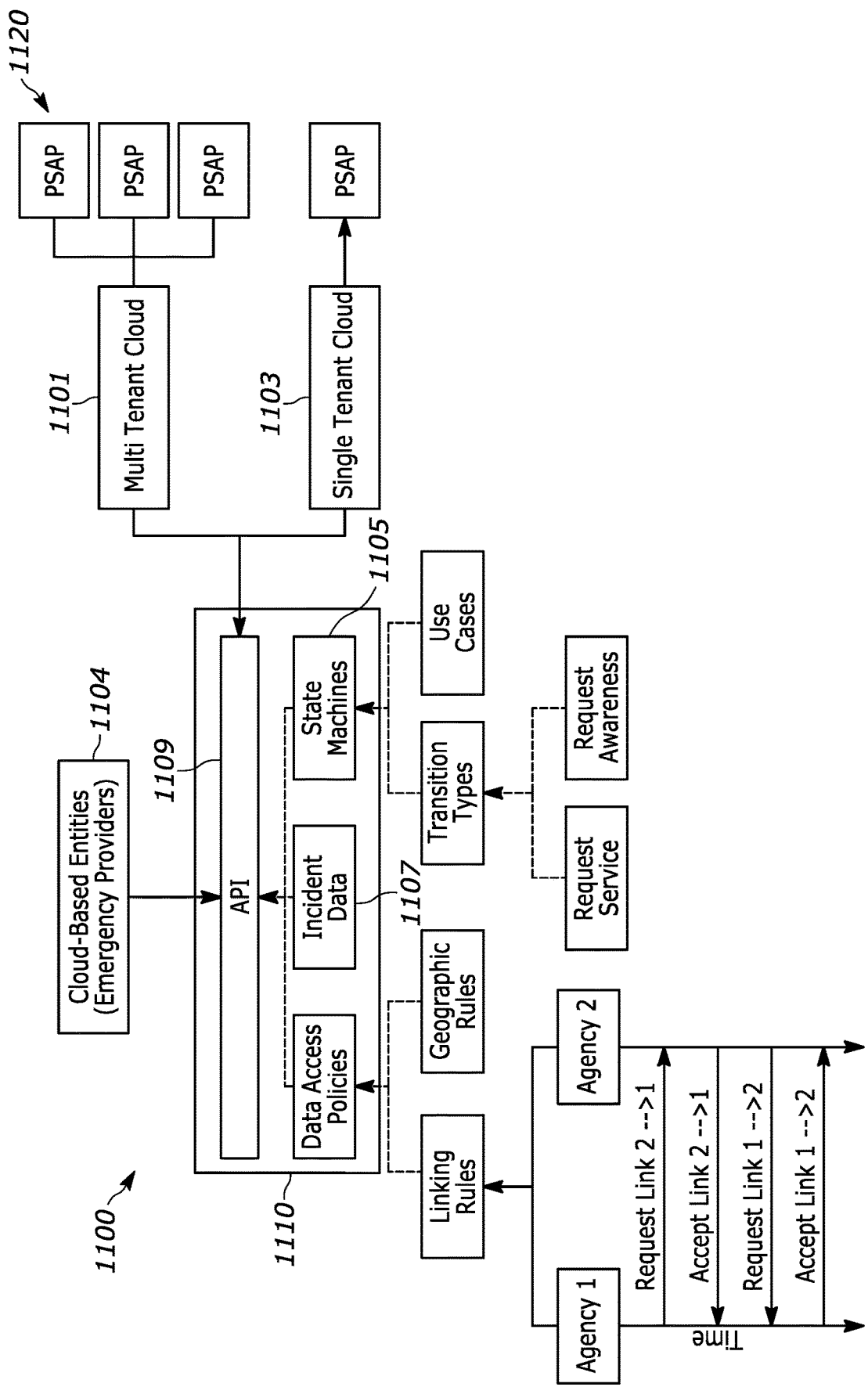
FIG. 11 is a diagram of another embodiment of an EDX using a state machine schema for sending and receiving data objects between various agencies.

FIG. 11 is a diagram of another embodiment of an EDX 1100 using a state machine schema for sending and receiving data objects between various agencies. At least one processor 1110 executes executable instructions from a non-transitory, non-volatile memory (not shown) to provide a multi-tenant cloud-based application environment 1101 operative to provide multiple application instances to a plurality of agency computer systems (such as PSAP computer systems), a single-tenant cloud-based application environment 1103 operative to provide multiple application instances to a single agency computer system, or both types of environments. The processor or processors also provide an API 1109 that includes the capabilities for agencies to create links to each other to send and receive data objects, i.e. perform data exchange. The links created are subject to linking rules, geographic rules, and data access policies that determine how and what data objects can be sent and received by which agencies. Incident data 1107 is exchanged as data objects between the agencies accessing the API 1109 and using configurable state machines 1105 that are operative to facilitate data exchange between the various agency computer systems. The shared and exchanged data objects may be EIDOs however they may be data objects in other formats such as, but not limited to JSON data objects, XML data objects, XACML objects, or some proprietary data object format, etc.

Figure 12:
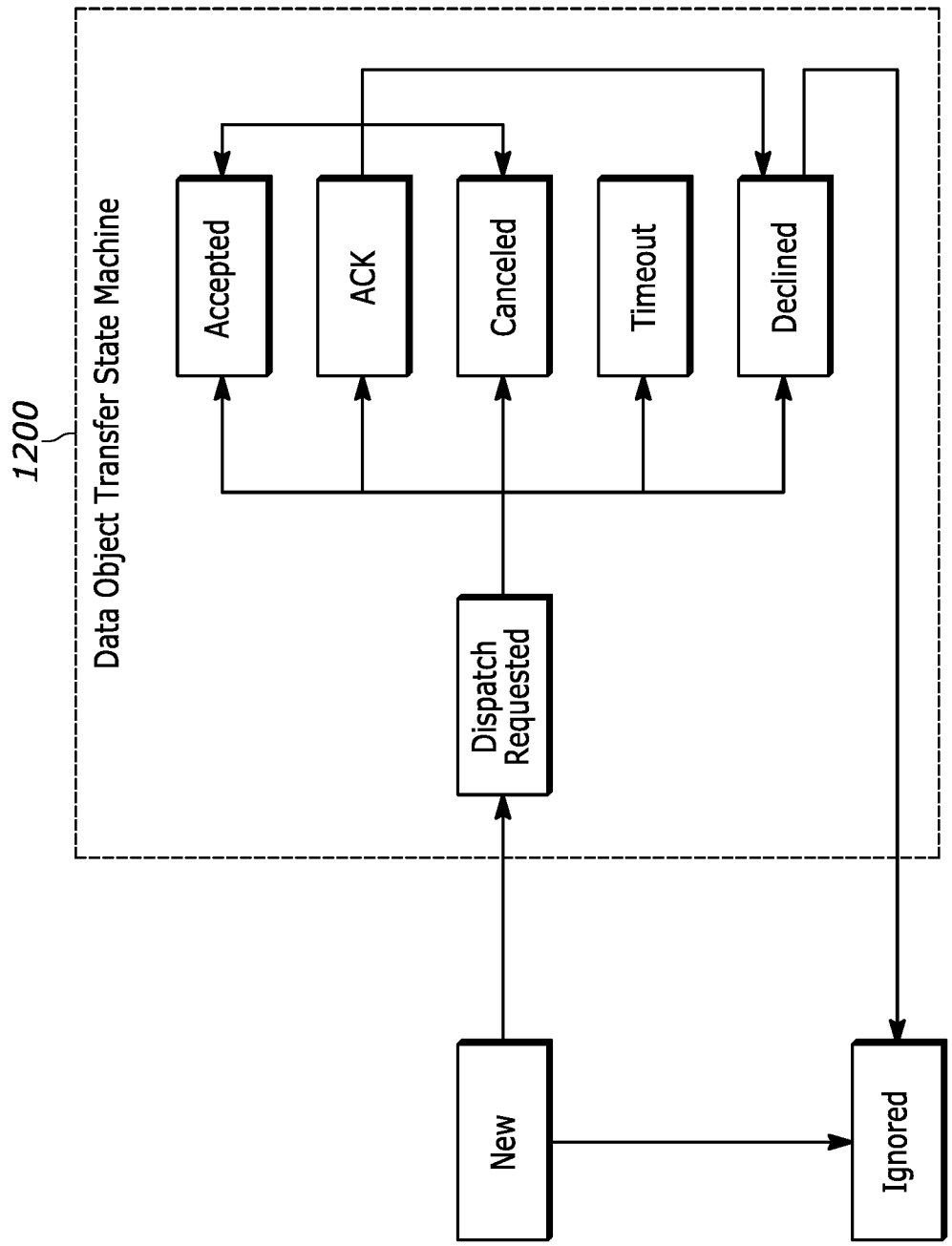
FIG. 12 is a diagram of an example state machine that includes the states "accepted," "acknowledged," "canceled," "timeout," "declined," "ignored," and "dispatch requested."

FIG. 12 is a diagram of an example state machine 1200 that includes the states "accepted," "acknowledged," "canceled," "timeout," "declined," "ignored," and "dispatch requested." One example embodiment of the state machine implementation may be used in a use can in which an alarm service provider (such as burglar, fire, gas detector, or other alarms etc.) provides alarm signal outputs to an agency such as a central station, and the central station shares the data with agencies such as ECCs or PSAPs to request dispatch of emergency responders to the location of the alarm or alert.

In this type of example use case, in order to prevent data staleness and preserve alert urgency, alerts will enter the timeout state if not placed into an acknowledged state within some allotted time frame. Therefore, in one example use case of the state machine example shown in FIG. 12, an alert is transition to the acknowledged (ACK) state as soon as it is received by the receiving agency such as an ECC. From there, the ECC may choose to accept or decline the alert, i.e. place the alert into an "accepted" or "declined" state.

As an example of procedures followed in the case of an alarm/alert service provider, central station and PSAP/ECC scenario, if for example, a central station receives a timeout event for an alert, an operator at the central station may place a phone call to the receiving agency (i.e. PSAP/ECC) as a failsafe mechanism. The PSAP/ECC could then discard the alert from their system.

Description of the State Machine States. The DISPATCH REQUESTED state means that a data object, which may be an alarm or alert, has been verified and sent to 911 (i.e. and ECC or PSAP) by a trained operator. The trained operator may be at a central station, or a trained operator monitoring data coming and going from the EDX. For an alarm service provider use case, the PSAP will transition the data object to the ACKNOWLEDGED state immediately upon receipt to avoid timeout. The ACKNOWLEDGED state means that a data object, such as an alert, has been acknowledged by the receiving agency such as a PSAP. The ACKNOWLEDGED state is an intermediate state between ACCEPTED and DECLINED. The ACCEPTED state means that the data object was accepted by the PSAP and that resources have been assigned to resolve the incident. The DECLINED state means that the data object (which may be an alert) has been declined by the receiving agency such as a PSAP. The CANCELED state means that the data object has been canceled by the originating agency (for example an alarm service provider) or via an intermediate operator. In that case, any resources assigned to the incident corresponding to the data object may be released. A TIMEOUT state means that the data object was not transitioned from the DISPATCH_REQUESTED state within an allotted time. The IGNORED state means that the data object was ignored by an operator of a receiving agency. A NEW state means a data object ownership state where there is no acceptance mechanism. The ACCEPTED state also represents a data object ownership state where there was an acceptance mechanism. The NEW state and the ACCEPTED state are therefore equivalent ownership states with respect to the ownership of a data object. A REQUEST SERVICE state may also be used for example, to send service requests between agencies that are not PSAPs. One example user case is sending a data object such as an alarm from an alarm system company to a central station, or from a central station to a towing company, PSAP, etc.

Other States that Initiate EDX data object subscriptions. Other states not shown in FIG. 12 may also be available such as an INFO REQUEST (or AWARENESS REQUEST). This state may be invoked where a sending agency wishes to receive updates from the receiving agency even if the receiving agency is taking ownership of the incident that corresponds to the data object. In other words, the previous data object owner would continue to receive information about the incident from the new data object owner that has taken responsibility. A REQUEST FOR RESOURCES state may also be present where resources are provided from a receiving agency to an incident corresponding to a data object from a sending agency, but where the sending agency retains ownership of the date object. In that case the agency providing resources may wish to obtain information updates about the incident. These states therefore generate EDX subscription requests for information related to that data object and are subject to the policies and rules etc. for receiving the associated data.

In a use case of an alarm service provider, central station scenario, data objects may correspond to alarms (also referred to herein as "alerts") and these alerts may be displayed on a graphical user interface (GUI) at a PSAP. The GUI may be displayed in a web browser at the PSAP and correspond to an instance of a cloud-based application provided to a PSAP via the multi-tenant cloud-based application environment 1101 shown in FIG. 11.

The PSAP then, as an agency, in some embodiments, interacts with the alarm service provider and a central station to receive data object and these data objects correspond to "alerts" that are displayed on a GUI at the PSAP. The alerts may also be transitioned to various dispositions via the GUI at the PSAP.

With respect to state transitions, these may be accomplished in some embodiments via API messages. An example API request message to transition to an ACCEPTED state is the following:

```
PATCH /v1/alerts/alert-6e58d630-d28f-4623-ba01-
3207b497a9ba HTTP/1.1
Host: api.rapidsos.com
Authorization: Bearer YOUR-HTTP-ACCESS-TOKEN
{
"status": "ACCEPTED",
}.
```

An example response API message is the following:

```
{
"status": {
"name"; "ACCEPTED",
"display_name": "Accepted"
},
"last_updated_time": 1671736239735
}.
```

Figure 13:
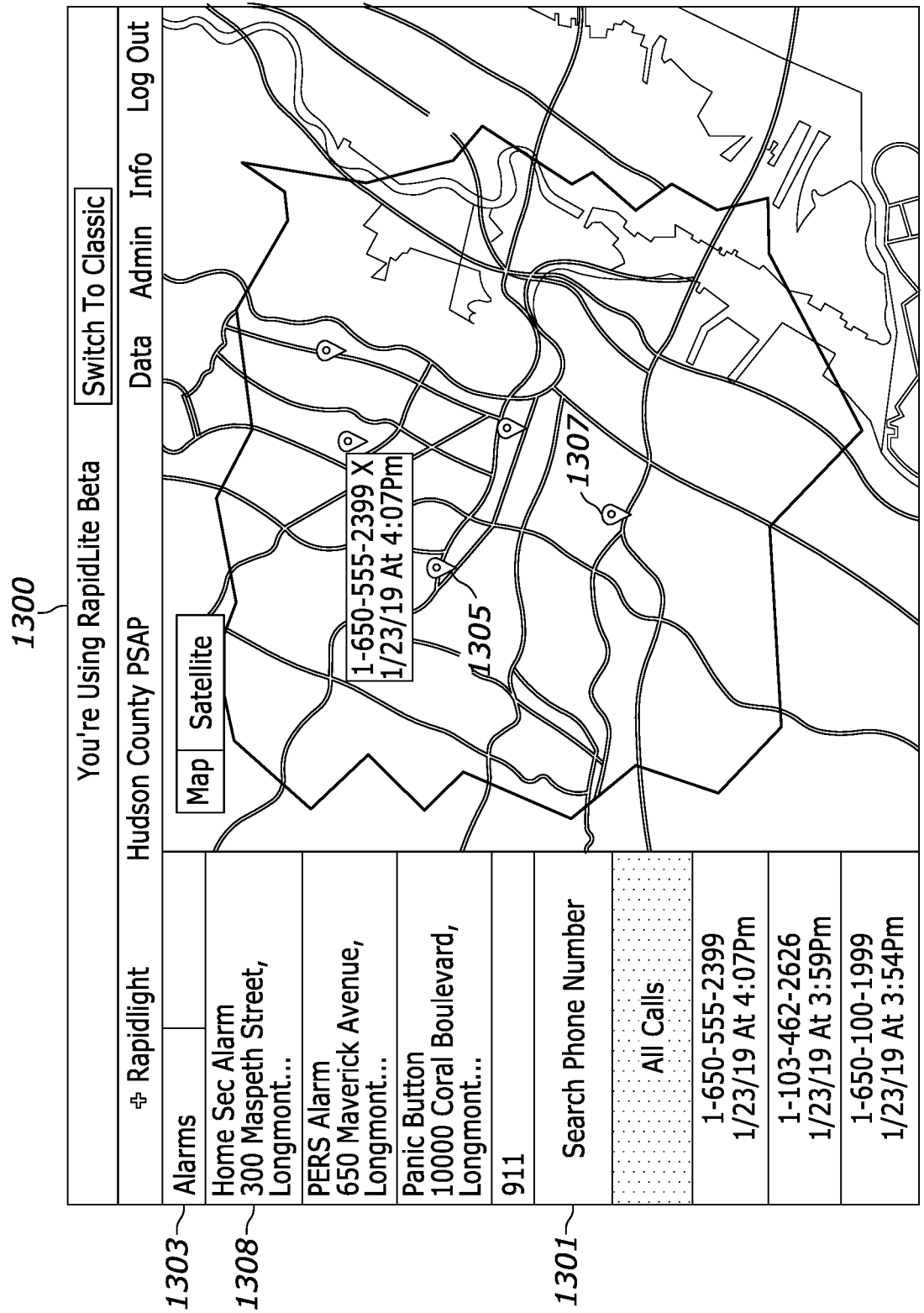
FIG. 13 depicts a GUI provided to a PSAP via a multi-tenant cloud-based application environment that provides a jurisdictional map view that includes an emergency call queue and an alarm queue.

FIG. 13 depicts an GUI 1300 provided to a PSAP via the multi-tenant cloud-based application environment 1101 that provides a jurisdictional map view that includes an emergency call queue and an alarm queue. The alarm queue is fed by data objects received from an alarm service provider and central station that are connected to the EDX 1100 and these data objects are handled using the state machine as shown in FIG. 12. The GUI 1300 display page shown provides interactive elements that allow a user to generate an emergency data request using, for example, data entry field 1301 through which a user can submit a device identifier, such as by typing or pasting the device identifier into the entry field 1301. After submitting a device identifier through the entry field 1301, the user can prompt generating and sending an emergency data request by selecting a search button. In response to a user submitting a device identifier into the entry field 1301 and selecting the search button, the application instance, represented by the GUI 1300, generates an emergency data request including the device identifier and a temporary access token to the multi-tenant cloud-based application environment 1101 and to the EDX 1100. Other data object subscription requests may also be made via different menus and data entry screens provided by the GUI 1300.

For example, acceptance of an alarm data object, as represented by entries in the GUI 1300 alarm queue 1303, will enable location indicators which are provided within a map view of the GUI 1300. For example, location indicator 1305 shows the location of a caller, and location indicator 1307 shows the location of alarm 1308 in the alarm queue 1303. By moving the cursor over a location indicator, for example location indicator 1305 as shown, emergency data is displayed in an overlay showing additional data such as, but not limited to, time, date, and the phone number (i.e. device identifier) etc. of the caller's device or of a contact corresponding to a received alarm.

On the left side of the GUI 1300, as alarms are sent and displayed in the alarm queue 1303, the operator of the GUI 1300 may ACKNOWLEDGE and then ACCEPT or DECLINE the data object and the associated incident. Selection of an entry from the alarm queue 1303 (or from the call queue) displays further information and options for changing the state of the incident (i.e. state of the associated data object). In some embodiments, for alarms, a GUI 1300 user may select an alarm from the alarm queue 1303 and display a location indicator for the alarm on the map view. The alarm location indicator may also display a textual description of additional data upon hovering the cursor over the alarm location indicator. The emergency data may include, but is not limited to, type of alarm such as burglar, fire, medical, etc., an address or location coordinate of the alarm, etc. For example, a fire alarm textual description may indicate whether the fire alarm is for a commercial building or a residential building, an address, and a contact phone number or other information, etc.

Figure 14:
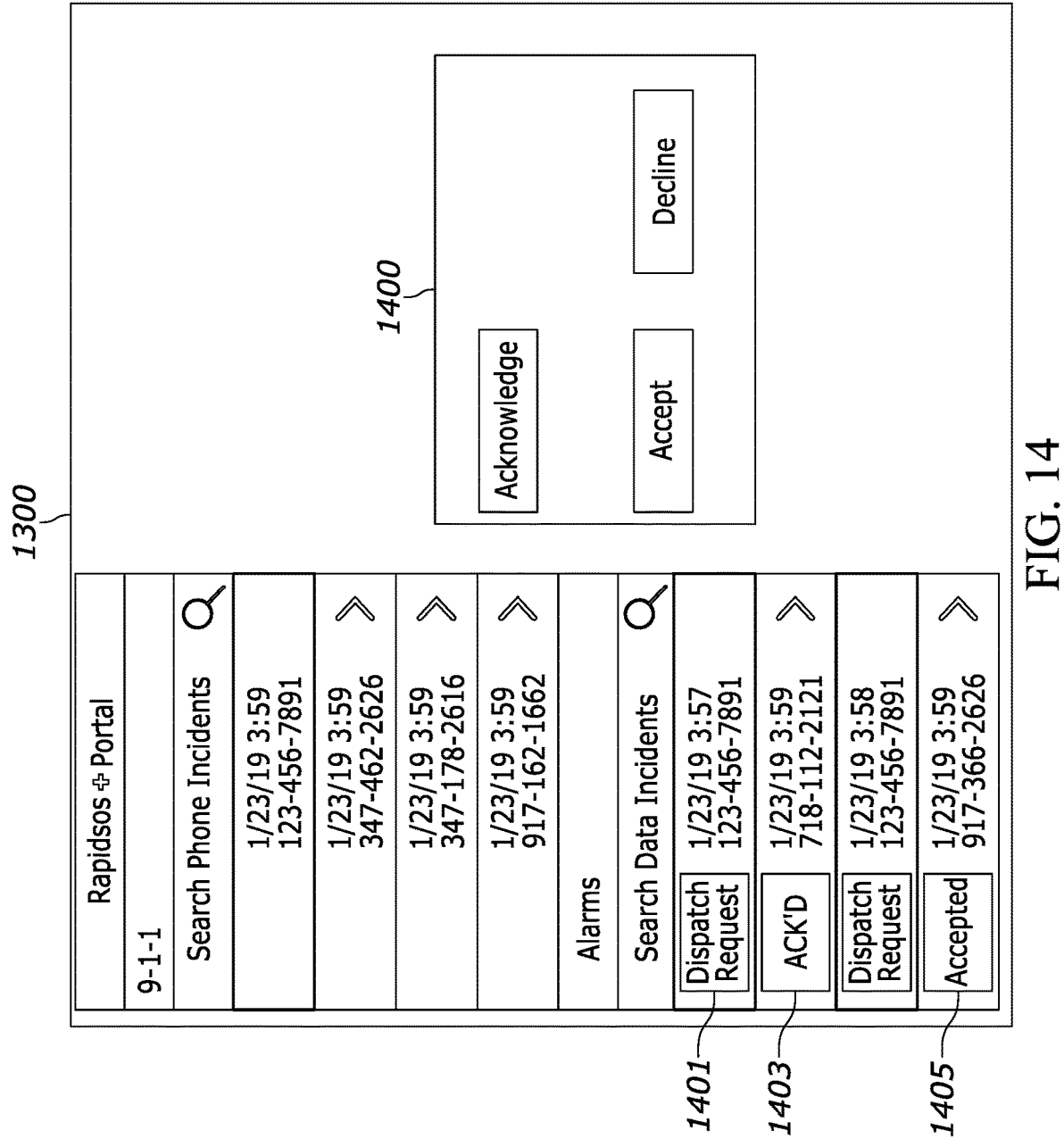
FIG. 14 is a diagram of the GUI of FIG. 13, displayed after selection of an incoming alarm data object selected from the alarm queue.

FIG. 14 is a diagram of the GUI 1300 displayed after selection of an incoming alarm data object selected from the alarm queue 1303. In some embodiments, when the alarm queue 1303 entry is selected by the user, a popup dialogue box 1400 may be displayed on the GUI 1300 enabling the user to select a state change for the alarm data object (which is displayed as an alarm incident in the GUI alarm queue 1303.

The popup dialogue box 1400 may provide selectable buttons to select state changes such as ACKNOWLEDGE, ACCEPT and DECLINE or other states. After selection of a state from the popup dialogue box 1400, the alarm queue 1303 entry may show a revised state status. For example, alarm queue entry 1401 indicates and incoming alarm (i.e. DISPATCH_REQUEST state), alarm queue entry 1403 indicates an alarm that has been acknowledged (ACKNOWLEDGED state), and alarm queue entry 1405 indicates an accepted alarm (ACCEPTED state) for which resources will be allocated.

Figure 15:
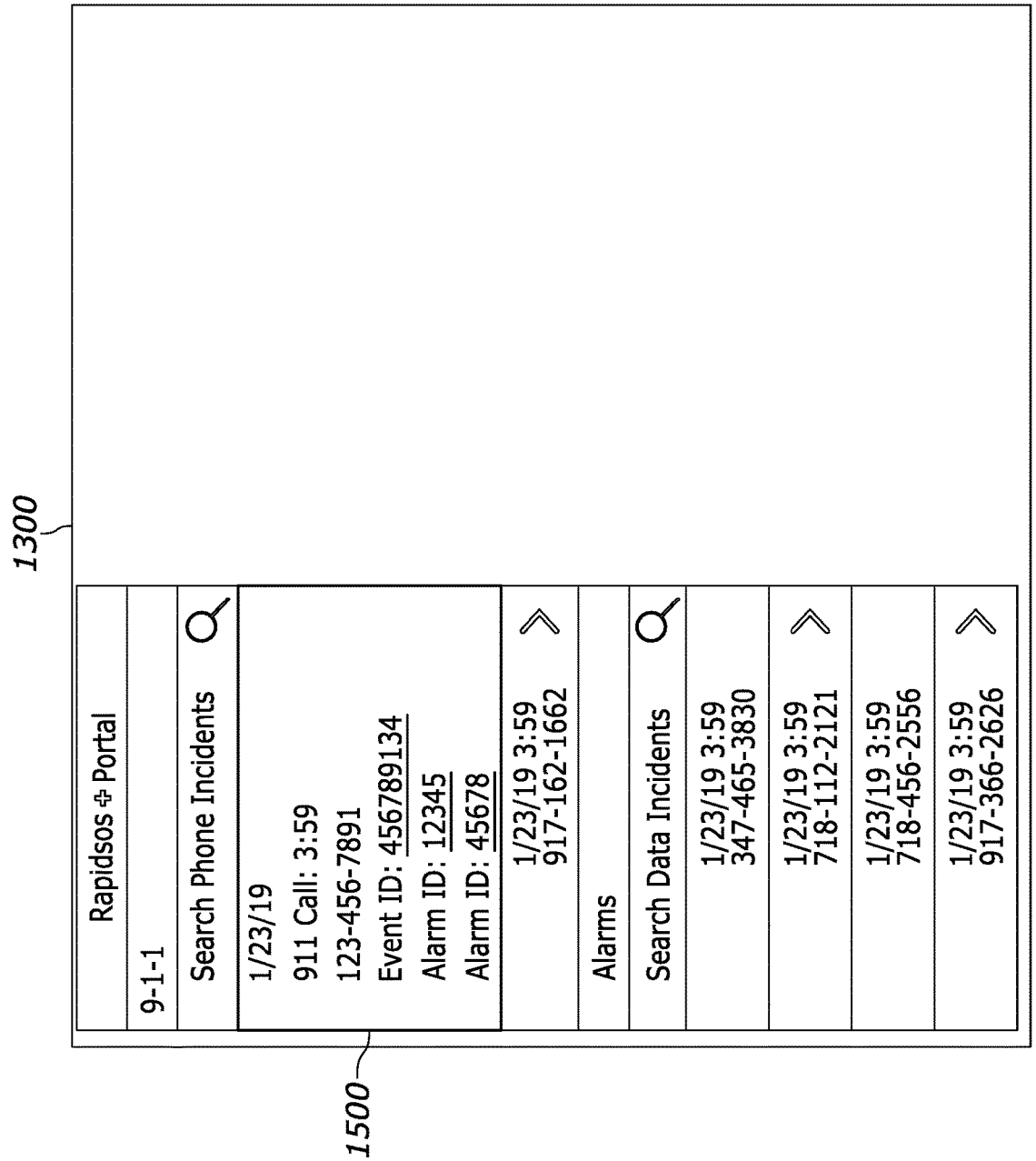
FIG. 15 shows an alarm queue entry showing identifiers associated with at least one data object corresponding to an incident.

In FIG. 15, a queue entry 1500 shows identifiers associated with at least one data object corresponding to the incident (Event ID) and alarm IDs. This display may also occur in response to selection of an alarm queue entry in the alarm queue 1303. The GUI 1300 may also provide for disposition updates for the various alarms. This operation may, for example, update the disposition of alarms that were accepted with the GUI 1300. In one example embodiment, alarm dispositions are only set when an alarm has been updated to the ACCEPTED state, or when an alarm is already in ACCEPTED status.

Alarm Disposition Descriptions. The following provide examples of dispositions that may be used in some embodiment and these dispositions may be displayed in the alarm queue entries similar to the state indications shown in the examples of FIG. 14. A DISPATCHED state means that resource have been dispatched for the incident corresponding to the alarm entry (and corresponding data object). An ENROUTE state means that resources are en route to the incident location. A PREEMPTED state means that dispatched resources were called off for either a higher priority event or other reason. An ON_SCENE state means that resources are on scene at the incident location. A CLEARED_NO_REPORT state means that the incident has been cleared as a false alarm. A CLEARED_WITH_REPORT state means that the incident has been cleared as a valid alarm. A CLOSED state means that the incident has been completely resolved. An example request API message to update a disposition state is as follows:

```
PATCH /v1/alerts/alert-6e58d630-d28f-4623-ba01-
3207b497a9ba HTTP/1.1
Host: api-sandbox.rapidsos.com
Authorization: Bearer YOUR-HTTP-ACCESS-TOKEN
{
"disposition": "DISPATCHED",
}.
```

An example response API message is as follows:

```
{
"disposition": {
"name": "DISPATCHED",
"display_name": "Dispatched"
},
"last_updated_time": 1671736239735
}.
```

Figure 16:
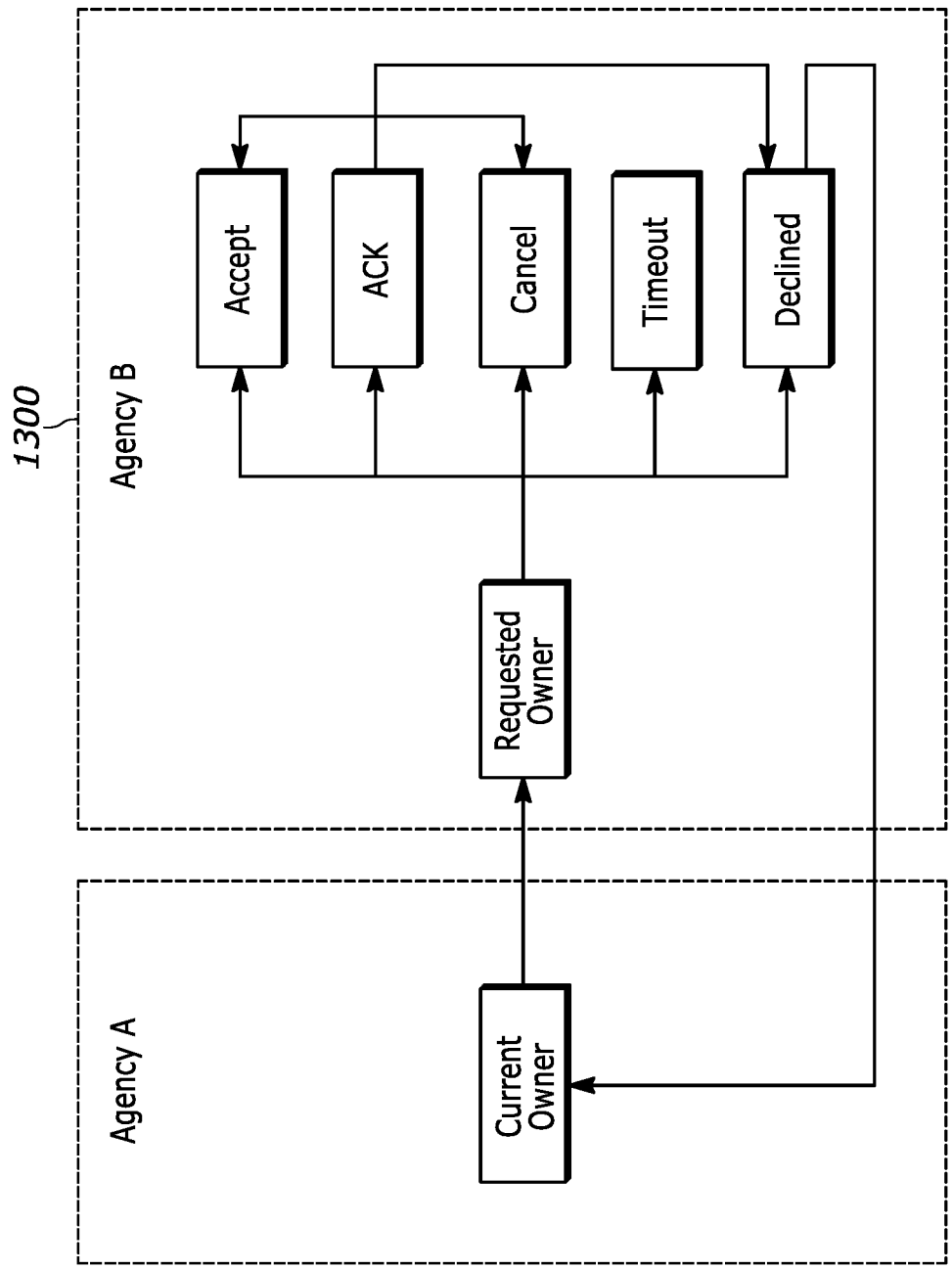
FIG. 16 is a diagram illustrating the relationship of state machine states between two agencies, Agency A and Agency B, where Agency A is a current owner of a data object and Agency B is the requested owner.

FIG. 16 is a diagram illustrated the relationship of state machine states between two agencies, Agency A and Agency B, where Agency A is a current owner of a data object and Agency B is the requested owner. Agency B may implement the state machine 1300 and change the state of the data object to any of the various states, ACCEPT, ACK, CANCEL, TIMEOUT, or DECLINED. The TIMEOUT may occur after some allotted time for changing states to ACK or ACCEPT.

Figure 17:
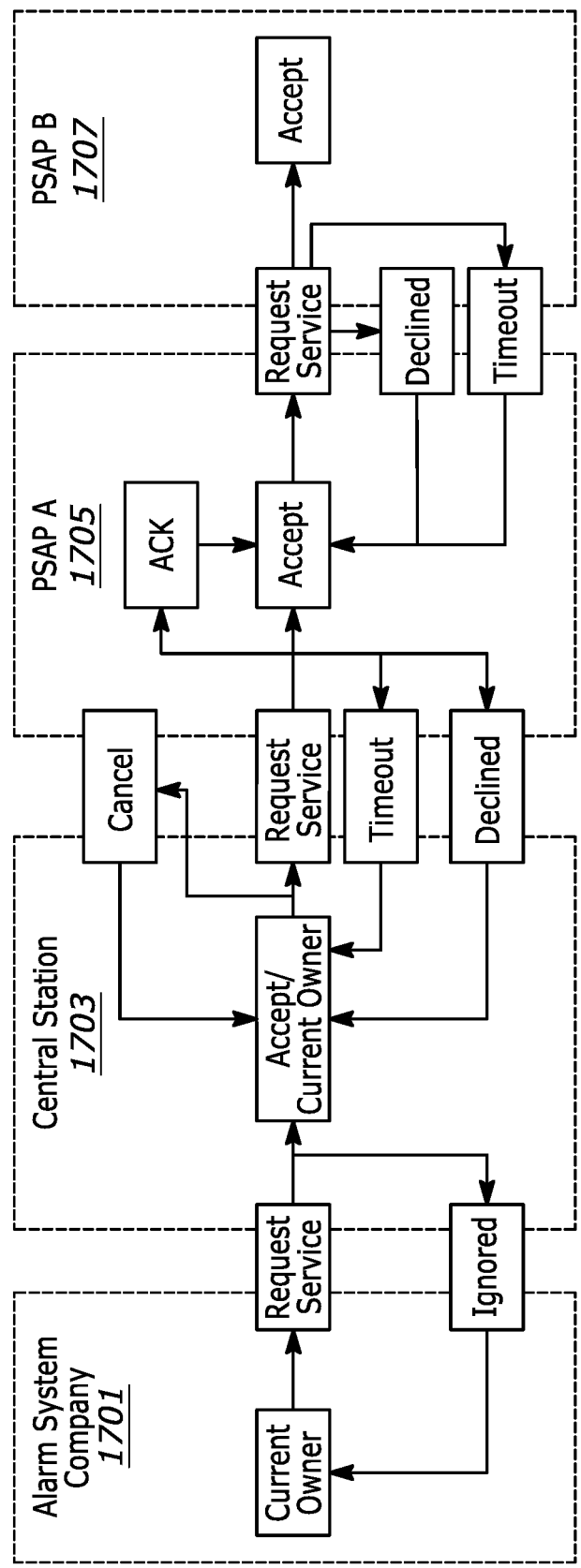
FIG. 17 is an example implementation of the EDX state machine interface for systems such as described with respect to the GUI shown in FIG. 13.

FIG. 17 is an example implementation of the EDX state machine interface for system such as described above with respect to the GUI 1300. An alarm system company 1701 may send alarm data objects to a central station 1703, which may then further send the data objects to PSAP A. PSAP A may send, or share, the data objects with PSAP B.

The alarm system company 1701 as the data object owner sends a service requested to the central station 1703. If the central station 1703 determines that the data object represents a false alarm, the central station 1703 may place the state into the IGNORED state and the date object state at the alarm system company 1701 would also reflect the state change.

If the central station 1703 accepts the data object (i.e. it is not a false alarm) then the central station 1703 becomes the current owner of the data object and the data object is in the ACCEPTED state. The central station 1703 may then send a REQUEST SERVICE (which may also be a DISPATCH REQUEST), to PSAP A 1705. If the central station 1703 later determines that the alarm has been resolved prior to dispatch of emergency responders to the scene, the central station 1703 may change the data object state to CANCELED and this would be reflected at PSAP A 1705, by for example changing a state indicator on the GUI 1300 at the PSAP. If PSAP A 1705 does not ACK or ACCEPT the REQUEST SERVICE within allotted period of time (for example 60 seconds or some other allotted time period which may be determined by PSAP or central station operating procedures and requirements) then the data object will go into the TIMEOUT state and some other action must be invoked (such as the central station operator calling someone at the PSAP etc.). PSAP A 1705 may ACK the data object which will then prevent it from going into a TIMEOUT state. PSAP A 1705 may then ACCEPT or DECLINE. If PSAP A 1705 places the date object onto the DECLINED state this is indicated at the central station 1703 and the central station 1703 must take other action which may include sending a new request with updated credentials for example. If PSAP A 1705 places the data object into the ACCEPT state (which in some embodiments may be accomplished using the procedure described with respect to FIG. 14), then PSAP A 1705 takes over ownership of the data object (i.e. takes responsibility for the corresponding incident).

In the example of FIG. 17, PSAP A 1705 sends a REQUEST SERVICE state to PSAP B 1707. The state machine for PSAP B 1707 has no ACK state and therefore PSAP B 1707 can only ACCEPT or DECLINE the data object. If no state change occurs at PSAP B 1707, the data object will enter the TIMEOUT state, and PSAP A 1705 retains ownership and responsibility and must take some other action. The other action may include sending a new REQUEST SERVICE state to PSAP B 1707 with new or different credentials for example, or some other action.

Although the EDX system and state machine interface described herein is described with respect to transfer and sharing of emergency data in an emergency network environment, the application of the EDX system described herein may be applicable to other applications other than emergency and therefore is not limited to such applications.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A data exchange cloud computer system comprising a plurality of cloud servers, each cloud server of the plurality of cloud-servers operative to:
   provide an application programming interface operative to establish a plurality of links to a plurality of agency computer systems comprising public safety answering point (PSAP) computer systems, the links enabling data exchange between the plurality of agency computer systems;
   provide configurable data object transfer state machines, operative to facilitate emergency incident data object (EIDO) exchange between the plurality of agency computer systems, the configurable state machines comprising an accepted state, an acknowledged state, a canceled state, a timeout state, and a declined state, wherein the accepted state is an indication that an EIDO from a sending agency has been accepted by a receiving agency, and that the receiving agency has assigned resources to resolve an emergency associated with the EIDO; and
   provide control of data flow from the data exchange cloud computer system to the plurality of agency computer systems via subscribe and unsubscribe actions in which each agency computer system can subscribe and unsubscribe to all updates for a specific incident identifier to receive EIDOs for the specific incident identifier, and each agency computer system can subscribe and unsubscribe to receive EIDOs for new incidents.

2. The data exchange cloud computer system of claim 1, further comprising:
   a multi-tenant cloud-based application environment operative to provide multiple application instances to a plurality of agency computer systems.

3. The data exchange cloud computer system of claim 1, further comprising:
   a single-tenant cloud-based application environment operative to provide multiple application instances to a single agency computer system.

4. The data exchange cloud computer system of claim 1, wherein the configurable state machine comprises an acknowledged state that is an indication that a data object has been acknowledged to a sending agency by a receiving agency.

5. The data exchange cloud computer system of claim 1, wherein the configurable state machine comprises a declined state that is an indication that a data object from a sending agency has been declined by a receiving agency.

6. The data exchange cloud computer system of claim 1, wherein the configurable state machine comprises a canceled state that is an indication that an data object has been canceled by a sending agency.

7. The data exchange cloud computer system of claim 1, wherein a data object state is changed to an acknowledged state via a graphical user interface entry received at the receiving agency.

8. The data exchange cloud computer system of claim 1, wherein a data object state is changed to an accepted state via a graphical user interface entry received at the receiving agency.

9. The data exchange cloud computer system of claim 1, further comprising:
   executable instructions stored in non-volatile, non-transitory memory, that when executed provide the application programming interface.

10. The data exchange cloud computer system of claim 1, further comprising:
    executable instructions stored in non-volatile, non-transitory memory, that when executed provide the configurable state machines.

11. A method of operating a data exchange cloud computer system comprising a plurality of cloud servers:
    providing an application programming interface operative to establish a plurality of links to the plurality of agency computer systems comprising public safety answering point (PSAP) computer systems, the links enabling data exchange between the plurality of agency computer systems;
    providing configurable data object transfer state machines, operative to facilitate emergency incident data object (EIDO) exchange between the plurality of agency computer systems, the configurable state machines comprising an accepted state, an acknowledged state, a canceled state, a timeout state, and a declined state, wherein the accepted state is an indication that an EIDO from a sending agency has been accepted by a receiving agency, and that the receiving agency has assigned resources to resolve an emergency associated with the EIDO; and
    providing control of data flow from the data exchange cloud computer system to the plurality of agency computer systems via subscribe and unsubscribe actions in which each agency computer system can subscribe and unsubscribe to all updates for a specific incident identifier to receive EIDOs for the specific incident identifier, and each agency computer system can subscribe and unsubscribe to receive EIDOs for new incidents.

12. The method of claim 11, further comprising:
    providing a multi-tenant cloud-based application environment; and
    providing multiple application instances to a plurality of agency computer systems via the multi-tenant cloud-based application environment.

13. The method of claim 11, further comprising:
    providing a single-tenant cloud-based application environment; and providing multiple application instances to a single agency computer system via the single-tenant cloud-based application environment.

14. The method of claim 11, further comprising:
indicating that a data object has been acknowledged to a sending agency by a receiving agency by an acknowledged state.

* * * * *